United States Patent
Hashimoto et al.

(10) Patent No.: US 11,685,405 B2
(45) Date of Patent: Jun. 27, 2023

(54) VEHICLE CONTROLLER, METHOD, AND COMPUTER PROGRAM FOR VEHICLE TRAJECTORY PLANNING AND CONTROL BASED ON OTHER VEHICLE BEHAVIOR

(71) Applicants: TOYOTA JIDOSHA KABUSHIKI KAISHA, Toyota (JP); DENSO CORPORATION, Kariya (JP)

(72) Inventors: Daisuke Hashimoto, Chofu (JP); Ryusuke Kuroda, Tokyo-to (JP); Tetsuro Sugiura, Chofu (JP); Hitoshi Kamada, Kawasaki (JP)

(73) Assignees: TOYOTA JIDOSHA KABUSHIKI KAISHA, Toyota (JP); DENSO CORPORATION, Kariya (JP)

(*) Notice: Subject to any disclaimer, the term of this patent is extended or adjusted under 35 U.S.C. 154(b) by 164 days.

(21) Appl. No.: 17/218,280

(22) Filed: Mar. 31, 2021

(65) Prior Publication Data
US 2021/0309214 A1 Oct. 7, 2021

(30) Foreign Application Priority Data

Apr. 6, 2020 (JP) ............................ JP2020-068685

(51) Int. Cl.
*B60W 60/00* (2020.01)
*B60W 30/08* (2012.01)
(Continued)

(52) U.S. Cl.
CPC ...... *B60W 60/00272* (2020.02); *B60W 30/08* (2013.01); *G06F 18/24* (2023.01);
(Continued)

(58) Field of Classification Search
CPC ......... B60W 30/08; B60W 2554/4045; B60W 2420/403; G06V 10/25; G06V 20/58; G06K 9/6267
See application file for complete search history.

(56) References Cited

U.S. PATENT DOCUMENTS

| 2010/0036578 A1 | 2/2010 | Taguchi et al. |
| 2014/0279707 A1* | 9/2014 | Joshua ............... G06Q 30/0283 701/1 |

(Continued)

FOREIGN PATENT DOCUMENTS

| DE | 112007001501 T5 * | 6/2009 | ............. B60K 31/00 |
| JP | 2008-123197 A | 5/2008 | |

(Continued)

OTHER PUBLICATIONS

Machine Translation of DE 112007001501 T5, Andersson (Year: 2009).*

(Continued)

*Primary Examiner* — Peter D Nolan
*Assistant Examiner* — Kenneth M Dunne
(74) *Attorney, Agent, or Firm* — Sughrue Mion, PLLC

(57) ABSTRACT

A vehicle controller includes a processor configured to detect an object region including another vehicle near a vehicle from each of time series images obtained by a camera mounted on the vehicle; detect a predetermined action taken by the other vehicle, based on a trajectory of the other vehicle estimated from the object region of each image; identify the state of a signal light of the other vehicle, based on characteristics obtained from pixel values of the object region of each image; extract information indicating characteristics of an action of the other vehicle or the state of a signal light at the predetermined action taken by the other vehicle, based on the predetermined action detected in a tracking period and the state of the signal light related to (Continued)

| IDENTIFICATION NUMBERS | NUMBERS OF LANE CHANGES | RATES OF OCCURRENCE OF LANE CHANGES | RATES OF LIGHTING-UP OF TURN SIGNALS | RATES OF NONPERFORMANCE OF LANE CHANGES | AVERAGE TIME LAGS |
|---|---|---|---|---|---|
| 1 | 4 | 1.5 | 0.4 | 0.0 | 1.1 |
| 2 | 2 | 0.5 | 1.0 | 0.3 | 4.2 |
| 3 | 2 | 0.8 | 1.0 | 0.0 | 3.0 |
| ⋮ | ⋮ | ⋮ | ⋮ | ⋮ | ⋮ |

900 the predetermined action; and predict behavior of the other vehicle, using the extracted information.

14 Claims, 10 Drawing Sheets

(51) Int. Cl.
  *G06V 10/25* (2022.01)
  *G06V 20/58* (2022.01)
  *G06F 18/24* (2023.01)

(52) U.S. Cl.
  CPC .............. *G06V 10/25* (2022.01); *G06V 20/58* (2022.01); *B60W 2420/403* (2013.01); *B60W 2554/4045* (2020.02)

(56) References Cited

U.S. PATENT DOCUMENTS

| | | |
|---|---|---|
| 2017/0174261 A1* | 6/2017 | Micks ................ B62D 15/0255 |
| 2017/0262750 A1 | 9/2017 | Kozuka et al. |
| 2017/0267178 A1* | 9/2017 | Shiga ................ H01L 27/1464 |
| 2018/0339710 A1 | 11/2018 | Hashimoto |
| 2019/0034762 A1 | 1/2019 | Hashimoto |
| 2019/0092318 A1 | 3/2019 | Mei et al. |
| 2019/0113927 A1* | 4/2019 | England .............. G05D 1/0221 |
| 2019/0171912 A1 | 6/2019 | Vallespi-Gonzalez et al. |
| 2019/0197729 A1 | 6/2019 | Liang et al. |
| 2019/0333381 A1 | 10/2019 | Shalev-Shwartz et al. |
| 2019/0354835 A1 | 11/2019 | Mac et al. |
| 2019/0367026 A1 | 12/2019 | Hattori et al. |
| 2019/0383626 A1* | 12/2019 | Fowe .................. G08G 1/0133 |
| 2020/0097739 A1 | 3/2020 | Hashimoto et al. |
| 2020/0097756 A1 | 3/2020 | Hashimoto et al. |
| 2020/0111031 A1 | 4/2020 | Wakim et al. |
| 2020/0160126 A1* | 5/2020 | Malach .................. B60R 11/04 |
| 2020/0160704 A1* | 5/2020 | Choi ............... G08G 1/096716 |
| 2020/0301429 A1 | 9/2020 | Matsunaga et al. |
| 2020/0346644 A1* | 11/2020 | Schmeichel .......... B60W 30/12 |
| 2020/0353932 A1 | 11/2020 | Wang et al. |
| 2020/0358863 A1 | 11/2020 | Ichikawa |
| 2021/0042542 A1 | 2/2021 | Littman et al. |
| 2021/0103746 A1 | 4/2021 | Chen et al. |
| 2021/0171025 A1 | 6/2021 | Ishikawa et al. |
| 2021/0174197 A1 | 6/2021 | Georgis |
| 2021/0312199 A1 | 10/2021 | Hashimoto et al. |
| 2022/0051413 A1 | 2/2022 | Itsumi et al. |
| 2022/0114807 A1 | 4/2022 | Iancu et al. |
| 2022/0301320 A1 | 9/2022 | Hashimoto et al. |

FOREIGN PATENT DOCUMENTS

| | | |
|---|---|---|
| JP | 2008-257350 A | 10/2008 |
| JP | 2017-033270 A | 2/2017 |
| JP | 2017-162438 A | 9/2017 |
| JP | 2018-101317 A | 6/2018 |
| JP | 2018-144695 A | 9/2018 |
| JP | 2019-70934 A | 5/2019 |
| JP | 2019-109691 A | 7/2019 |

OTHER PUBLICATIONS

Alex Kendall et al., "Multi-Task Learning Using Uncertainty to Weigh Losses for Scene Geometry and Semantics", CVPR2018, arXiv:1 705.07115v3 [cs.CV] Apr. 24, 2018, pp. 1-14.

Anna Petrovskaya et al., "Model Based Vehicle Tracking for Autonomous Driving in Urban Environments", Robotics: Science and Systems 2008, 2008, Computer Science Department, Stanford University, Stanford, California, pp. 1-8.

Han-Kai Hsu et al., "Learning to Tell Brake and Turn Signals in Videos Using CNN-LSTM Structure", 2017 IEEE 20th International Conference on Intelligent Transportation Systems (ITSC), University of California, Merced Toyota Research Institute, Toyota Research Institute, North America, pp. 1-6.

Shaoqing Ren et al.," Faster R-CNN: Towards Real-Time Object Detection with Region Proposal Networks", NIPS, 2015, arXiv:1506. 01497v3 [cs.CV] Jan. 6, 2016, pp. 1-14.

Wei Liu et al., "SSD: Single Shot MultiBox Detector", ECCV 2016, arXiv:1512.02325v5 [cs.CV] Dec. 29, 2016, pp. 1-17, UNC Chapel Hill, Zoox Inc., Google Inc., University of Michigan, Ann-Arbor.

Young-Chul Yoon et al., "Online Multiple Pedestrians Tracking using Deep Temporal Appearance Matching Association", arXiv:1907. 00831v4 [cs.CV] Oct. 9, 2020, pp. 1-28.

United States Office Action dated Nov. 25, 2022 in United States U.S. Appl. No. 17/218,348.

U.S. Appl. No. 17/208,466, filed Mar. 22, 2021—Daisuke Hashimoto.

U.S. Appl. No. 17/218,348, filed Mar. 31, 2021—Daisuke Hashimoto et al.

* cited by examiner

FIG. 6
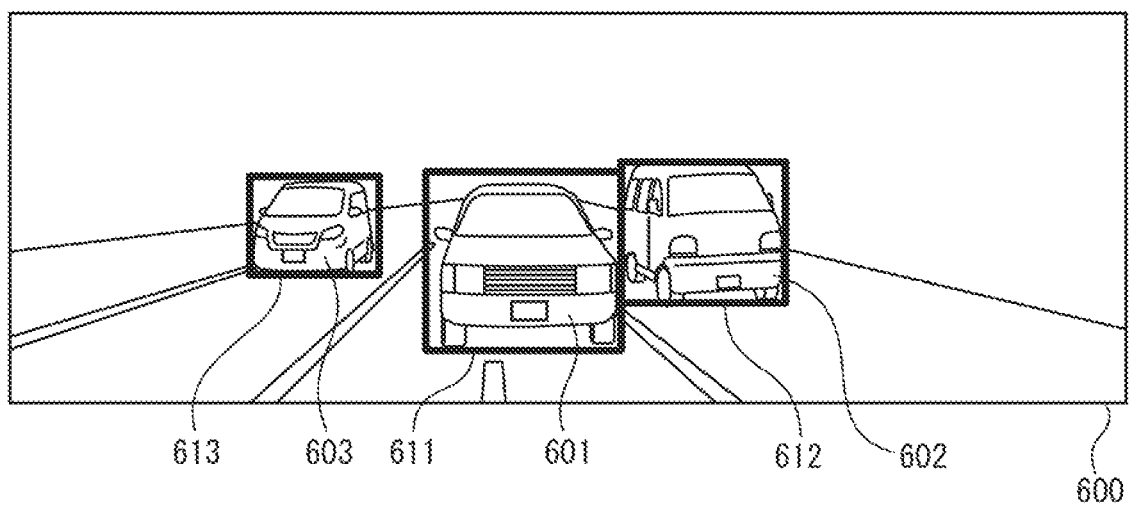
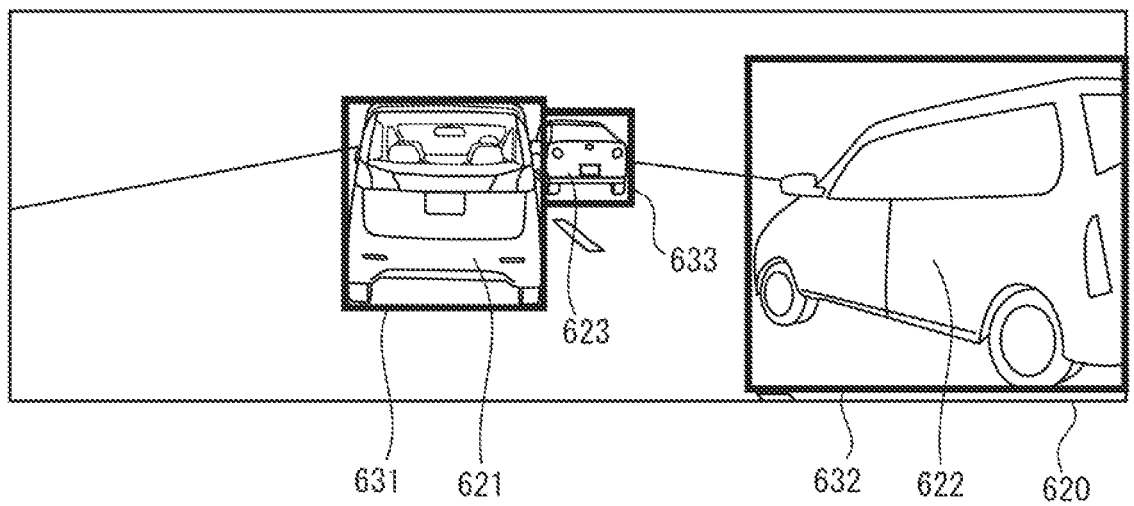

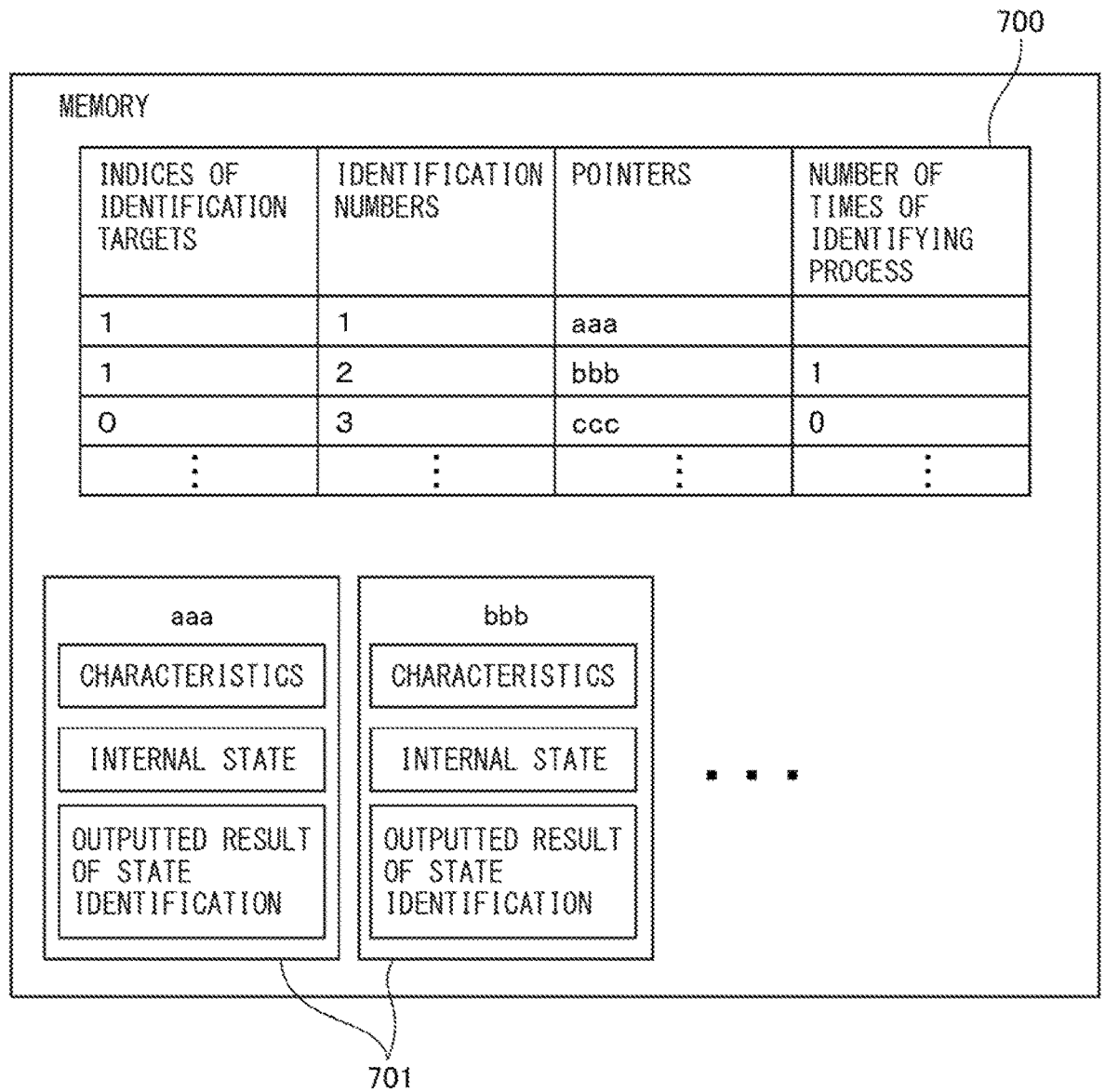

FIG. 8

| IDENTIFICATION NUMBERS | TYPES | POSITION COORDINATES | TIMINGS AND DIRECTIONS OF LANE CHANGES | BLINKING TIMINGS AND TYPES OF TURN SIGNALS |
|---|---|---|---|---|
| 1 | PASSENGER CAR | (a,b),(c,d),··· | (aa:bb:cc,LEFT),··· | (jj:kk:ll,LEFT),··· |
| 2 | PASSENGER CAR | (e,f),(g,h),··· | (dd:ee:ff,LEFT),··· | (mm:nn:oo,LEFT),··· |
| 3 | TRUCK | (i,j),(k,l),··· | (gg:hh:ii,RIGHT),··· | (pp:qq:rr,RIGHT),··· |
| ⋮ | ⋮ | ⋮ | ⋮ | ⋮ |

| IDENTIFICATION NUMBERS | NUMBERS OF LANE CHANGES | RATES OF OCCURRENCE OF LANE CHANGES | RATES OF LIGHTING-UP OF TURN SIGNALS | RATES OF NONPERFORMANCE OF LANE CHANGES | AVERAGE TIME LAGS |
|---|---|---|---|---|---|
| 1 | 4 | 1.5 | 0.4 | 0.0 | 1.1 |
| 2 | 2 | 0.5 | 1.0 | 0.3 | 4.2 |
| 3 | 2 | 0.8 | 1.0 | 0.0 | 3.0 |
| ⋮ | ⋮ | ⋮ | ⋮ | ⋮ | ⋮ |

900

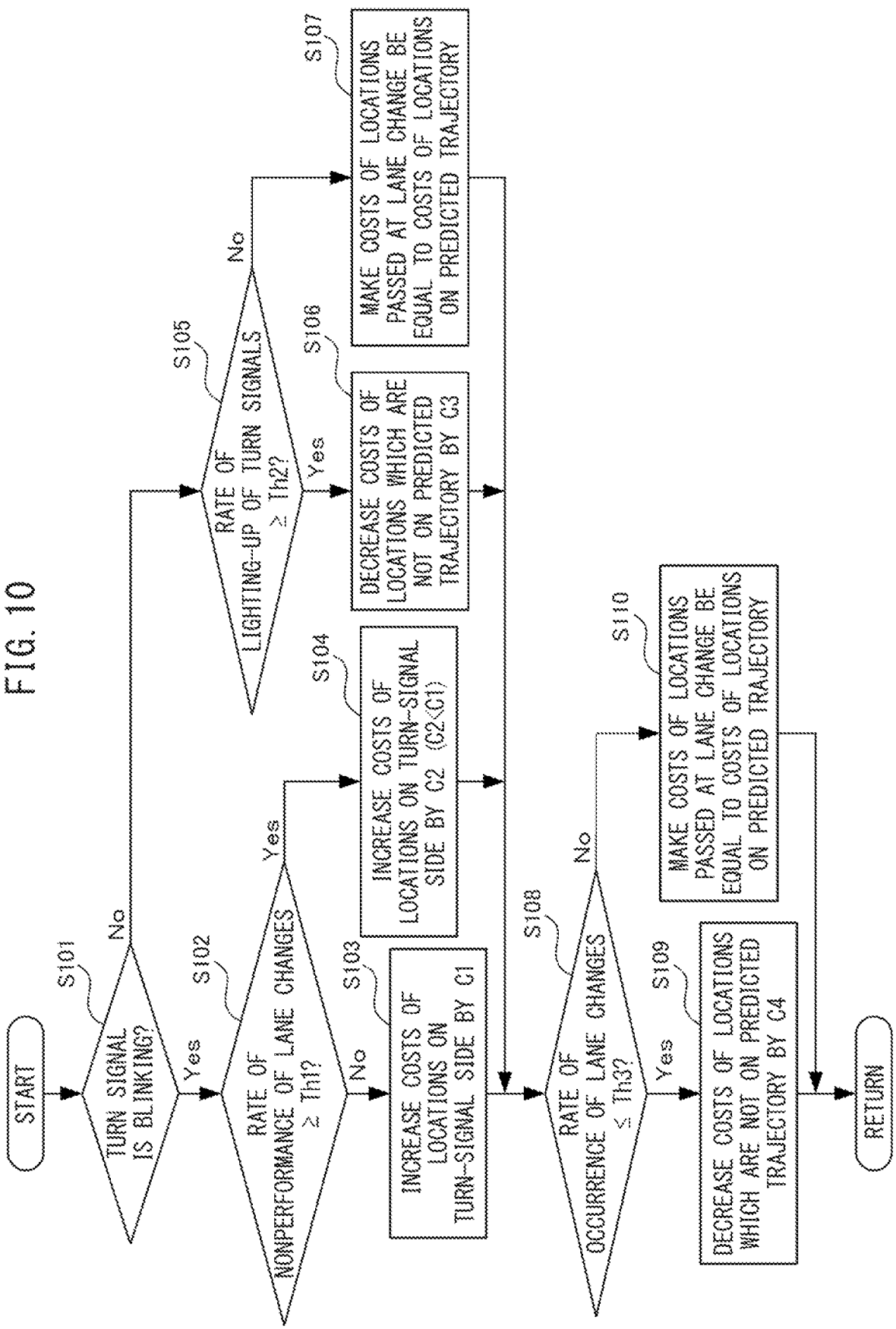

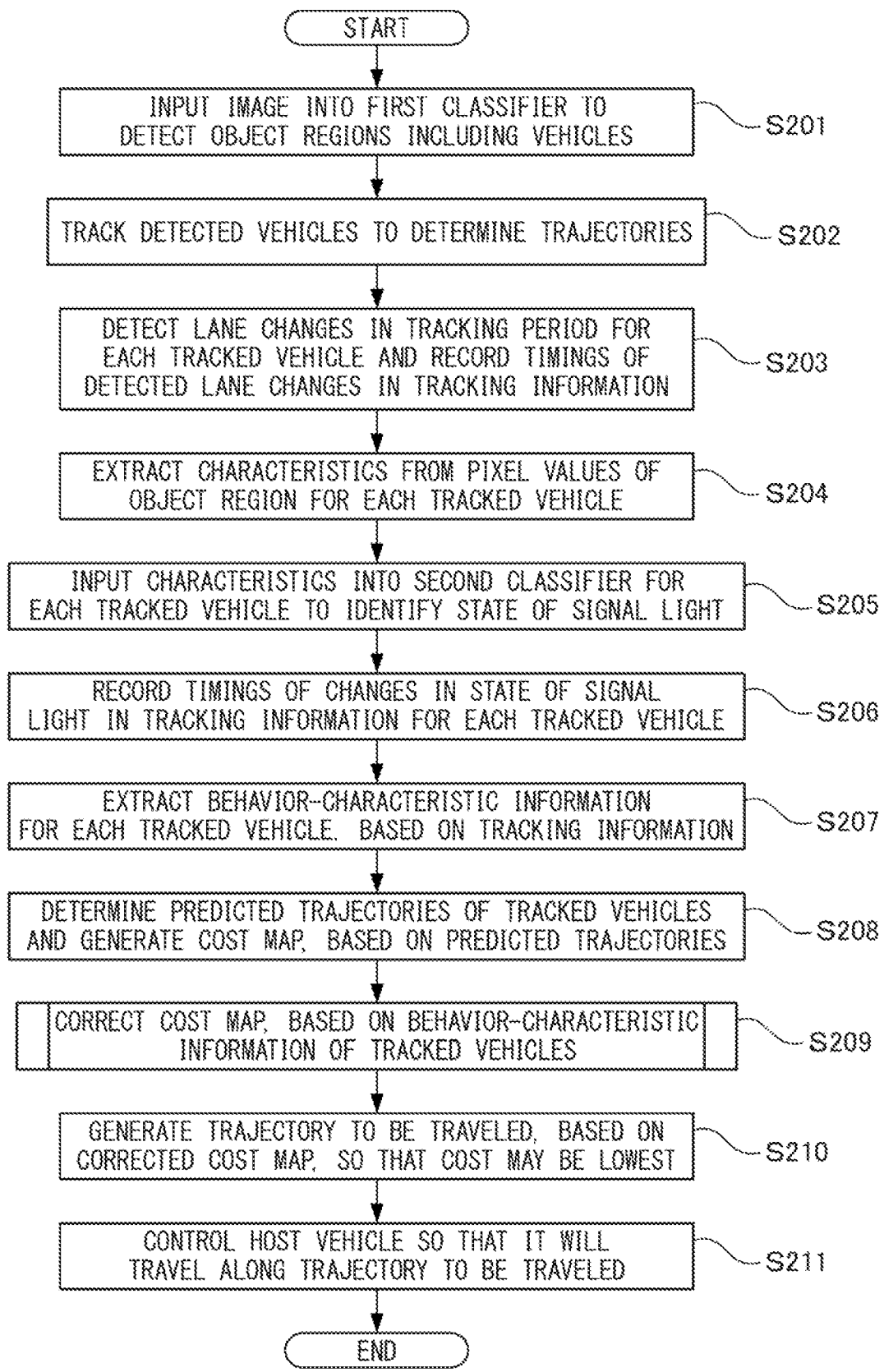

VEHICLE CONTROLLER, METHOD, AND COMPUTER PROGRAM FOR VEHICLE TRAJECTORY PLANNING AND CONTROL BASED ON OTHER VEHICLE BEHAVIOR

FIELD

The present invention relates to a vehicle controller, a method, and a computer program for controlling travel of a vehicle.

BACKGROUND

Techniques have been researched for controlling a vehicle to automatically drive the vehicle. Automatically driving a vehicle requires the vehicle to be controlled so as not to collide with an object near the vehicle. To this end, techniques have been proposed that predicts the behavior of an object near a vehicle and uses the result of prediction to control travel of the vehicle (e.g., see Japanese Unexamined Patent Publications Nos. 2008-123197 and 2008-257350).

For example, an automated-driving controller disclosed in Japanese Unexamined Patent Publication No. 2008-123197 predicts the behavior of a vehicle near a host vehicle, and uses the results of prediction made by the host vehicle and acquired from another automatically driven vehicle to prepare a cruise control plan for the host vehicle.

A driving support apparatus disclosed in Japanese Unexamined Patent Publication No. 2008-257350 predicts whether a leading vehicle traveling on the right or left lane relative to the travel lane of a host vehicle will change lanes to come to the host-vehicle's lane, based on whether a direction indicator of the leading vehicle is blinking, the position of the travel lane of the leading vehicle, leading vehicle information, lane disappearance information, and obstruction information. The driving support apparatus then performs driving support for a driver when the leading vehicle is predicted to change its lane to the host-vehicle's lane.

SUMMARY

As in the above-described techniques, the behavior of a vehicle near a host vehicle can be predicted to a certain extent by using information on the state of a direction indicator (turn signal) of the former vehicle. However, the time lag between when a turn signal starts blinking and when a lane change is actually made varies depending on drivers. Additionally, some drivers do not operate a turn signal at a lane change. For these reasons, the use of information on the state of a turn signal of a vehicle does not necessarily ensure sufficient accuracy of prediction on the behavior of this vehicle.

It is an object of the present invention to provide a vehicle controller that can improve the accuracy of prediction on the behavior of another vehicle near a host vehicle.

According to an aspect, a vehicle controller for controlling travel of a vehicle is provided. The vehicle controller includes a processor configured to: input time series images obtained by a camera mounted on the vehicle into a first classifier to detect an object region including another vehicle near the vehicle in each of the time series images; track the other vehicle to estimate a trajectory of the other vehicle, based on the object region of each of the time series images; detect a predetermined action taken by the other vehicle, based on the estimated trajectory; and input characteristics obtained from pixel values of the object region detected in each of the time series images into a second classifier to identify the state of a signal light of the other vehicle, the second classifier having a recursive structure or performing a convolution operation in a temporal direction. The processor is further configured to extract at least one piece of behavior-characteristic information indicating characteristics of an action of the other vehicle or the state of a signal light of the other vehicle at the predetermined action taken by the other vehicle, based on the predetermined action detected in a tracking period during which the other vehicle is tracked and the state of the signal light identified in the tracking period and related to the predetermined action; predict behavior of the other vehicle, using the at least one piece of behavior-characteristic information, create a trajectory to be traveled on which the vehicle will travel, based on the predicted behavior of the other vehicle; and control the vehicle so that the vehicle will travel along the trajectory to be traveled.

The processor preferably determines, based on the trajectory of the other vehicle, a predicted trajectory along which the other vehicle is predicted to pass from the current time to a predetermined time ahead, generates a cost map in which costs of locations on the predicted trajectory are set higher than costs of other locations, corrects the generated cost map, using the at least one piece of behavior-characteristic information, to obtain a corrected cost map representing the predicted behavior of the other vehicle, and creates the trajectory to be traveled in accordance with the corrected cost map so that costs on the trajectory to be traveled will be the lowest.

The processor preferably detects a lane change made by the other vehicle as the predetermined action taken by the other vehicle, and determines changing a turn signal of the other vehicle into a blinking state as changing into the state of the signal light related to the predetermined action.

In this case, the processor preferably extracts, as one of the at least one piece of behavior-characteristic information, a rate of nonperformance of lane changes that is a ratio of the number of times the other vehicle does not change lanes after blinking of a turn signal to the number of times the other vehicle makes a turn signal blink in the tracking period.

In the case that the processor has inputted characteristics of the object region in the latest image obtained by the camera after the time series images into the second classifier and thereby recognized that a turn signal of the other vehicle has changed into a blinking state, the processor preferably corrects the cost map so that costs of individual locations which the other vehicle assumed to change lanes to a direction indicated by the turn signal will pass are increased by a first value when the rate of nonperformance of lane changes is less than a first threshold and corrects the cost map so that the costs of the individual locations are increased by a second value smaller than the first value when the rate of nonperformance of lane changes is not less than the first threshold.

Alternatively, the processor preferably extracts, as one of the at least one piece of behavior-characteristic information, a rate of lighting-up of turn signals that is a ratio of the number of times the other vehicle makes a turn signal blink before changing lanes to the number of times the other vehicle changes lanes in the tracking period.

In the case that the processor has inputted characteristics of the object region in the latest image obtained by the camera after the time series images into the second classifier and thereby recognized that turn signals of the other vehicle are off, the processor preferably corrects the cost map so that costs of individual locations which are not on the predicted trajectory are decreased by a predetermined value when the rate of lighting-up of turn signals is not less than a second threshold and corrects the cost map so that costs of individual locations which the other vehicle assumed to change lanes will pass are equal to the costs of the locations on the predicted trajectory when the rate of lighting-up of turn signals is less than the second threshold.

Alternatively, the processor preferably extracts, as one of the at least one piece of behavior-characteristic information, a rate of occurrence of lane changes that is the number of lane changes made by the other vehicle per unit time.

In this case, the processor preferably corrects the cost map so that costs of individual locations which are not on the predicted trajectory are decreased by a predetermined value when the rate of occurrence of lane changes is not greater than a third threshold and corrects the cost map so that costs of individual locations which the other vehicle assumed to change lanes will pass are equal to the costs of the locations on the predicted trajectory when the rate of occurrence of lane changes is greater than the third threshold.

Alternatively, the processor preferably extracts, as one of the at least one piece of behavior-characteristic information, an average of time lags each of which is a period from when the other vehicle starts blinking a turn signal before a lane change in the tracking period until the other vehicle changes lanes.

In this case, upon input of the characteristics obtained from pixel values of the object region, the second classifier preferably outputs a confidence score indicating how likely a turn signal that is a signal light of the other vehicle to be blinking. The processor preferably determines that the turn signal is blinking, when the confidence score is not less than a confidence-score threshold, and decreases the confidence-score threshold by a predetermined value when the average of the time lags is less than a predetermined threshold.

Preferably, the vehicle further includes a second camera configured to capture a second capturing region to generate a second image, the second capturing region being different from a capturing region of the camera. The processor inputs the second image into the first classifier to detect an object region including the other vehicle in the second image, and compares the object region in the second image with the object region in one of the time series images to track the other vehicle.

Alternatively, the vehicle preferably further includes a range sensor configured to generate a ranging signal every predetermined period, the ranging signal including, for each angle in a predetermined range of angles around the vehicle, a measured value of a distance to an object located in the direction of the angle. The processor preferably determines a range of angles in the ranging signal obtained at a first time immediately before or after acquisition of one of the time series images, the range of angles corresponding to the object region in the one of the time series images, and compares the determined range of angles of the ranging signal obtained at the first time with the ranging signal obtained at a second time later than the first time, thereby tracking the other vehicle.

According to another aspect, a method for controlling travel of a vehicle is provided. The method includes inputting time series images obtained by a camera mounted on the vehicle into a first classifier to detect an object region including another vehicle near the vehicle in each of the time series images; tracking the other vehicle to estimate a trajectory of the other vehicle, based on the object region of each of the time series images; detecting a predetermined action taken by the other vehicle, based on the estimated trajectory; and inputting characteristics obtained from pixel values of the object region detected in each of the time series images into a second classifier to identify the state of a signal light of the other vehicle, the second classifier having a recursive structure or performing a convolution operation in a temporal direction. The method further includes extracting at least one piece of behavior-characteristic information indicating characteristics of an action of the other vehicle or the state of a signal light of the other vehicle at the predetermined action taken by the other vehicle, based on the predetermined action detected in a tracking period during which the other vehicle is tracked and the state of the signal light identified in the tracking period and related to the predetermined action; predicting behavior of the other vehicle, using the at least one piece of behavior-characteristic information; creating a trajectory to be traveled on which the vehicle will travel, based on the predicted behavior of the other vehicle; and controlling the vehicle so that the vehicle will travel along the trajectory to be traveled.

According to still another aspect, a non-transitory recording medium having recorded thereon a computer program for controlling travel of a vehicle is provided. The computer program includes instructions for causing a processor mounted on the vehicle to execute a process including: inputting time series images obtained by a camera mounted on the vehicle into a first classifier to detect an object region including another vehicle near the vehicle in each of the time series images; tracking the other vehicle to estimate a trajectory of the other vehicle, based on the object region of each of the time series images; detecting a predetermined action taken by the other vehicle, based on the estimated trajectory; and inputting characteristics obtained from pixel values of the object region detected in each of the time series images into a second classifier to identify the state of a signal light of the other vehicle, the second classifier having a recursive structure or performing a convolution operation in a temporal direction. The process further includes extracting at least one piece of behavior-characteristic information indicating characteristics of an action of the other vehicle or the state of a signal light of the other vehicle at the predetermined action taken by the other vehicle, based on the predetermined action detected in a tracking period during which the other vehicle is tracked and the state of the signal light identified in the tracking period and related to the predetermined action; predicting behavior of the other vehicle, using the at least one piece of behavior-characteristic information; creating a trajectory to be traveled on which the vehicle will travel, based on the predicted behavior of the other vehicle; and controlling the vehicle so that the vehicle will travel along the trajectory to be traveled.

The vehicle controller according to the present invention has an advantageous effect of being able to improve the accuracy of prediction on the behavior of another vehicle near a host vehicle.

BRIEF DESCRIPTION OF DRAWINGS

FIG. 6 illustrates examples of an object region including a vehicle that is a target for identification of the state of a signal light performed by the second classifier.

FIG. 7 illustrates an example of a detected-object list.

FIG. 8 illustrates an example of tracking information.

FIG. 9 illustrates an example of behavior-characteristic information.

FIG. 10 is an operation flowchart of cost-map correction based on the behavior-characteristic information.

FIG. 11 is an operation flowchart of the vehicle control process.

DESCRIPTION OF EMBODIMENTS

Hereinafter, a vehicle controller, a method for controlling travel of a vehicle and a computer program for controlling travel of a vehicle performed by the vehicle controller will be described with reference to the accompanying drawings. The vehicle controller identifies the state of a signal light, such as a turn signal, of another vehicle near a host vehicle to detect the timings of changes in the state of the signal light. The vehicle controller also tracks the other vehicle near the host vehicle, and detects and records a predetermined action of the other vehicle, such as a lane change made by the other vehicle. The vehicle controller then determines the characteristics of the state of the signal light of the other vehicle at the predetermined action taken by the other vehicle, based on the recorded timings of the predetermined action and of changes in the state of the signal light. The vehicle controller then corrects a cost map, which is used for creating a trajectory to be traveled of the host vehicle and expresses the probability of passing of the other vehicle as costs on a position-by-position basis, depending on the determined characteristics.

Figure 1:
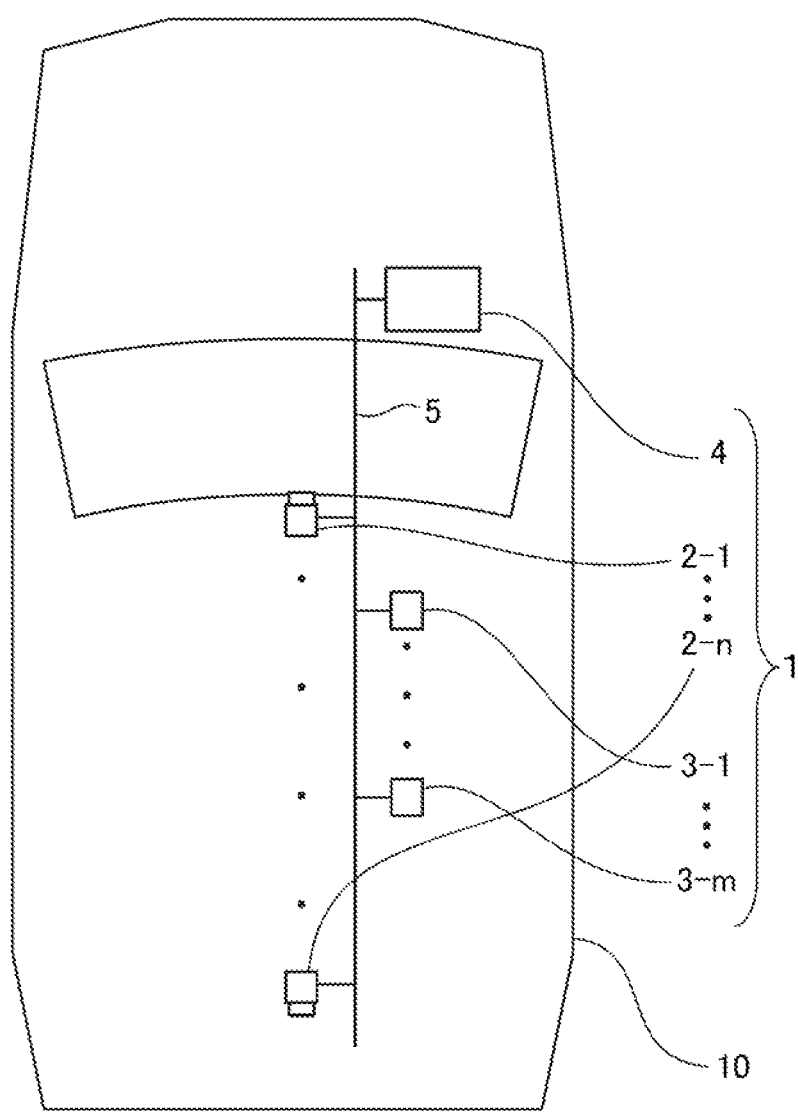
FIG. 1 schematically illustrates the configuration of a vehicle control system including a vehicle controller.

FIG. 1 schematically illustrates the configuration of a vehicle control system including a vehicle controller. In the present embodiment, the vehicle control system 1, which is mounted on a host vehicle 10 and controls the vehicle 10, includes cameras 2-1 to 2-$n$ (n is an integer not less than two) for capturing surroundings of the vehicle 10, range sensors 3-1 to 3-$m$ (m is an integer not less than two) for measuring the distance to an object near the vehicle 10, and an electronic control unit (ECU) 4, which is an example of the vehicle controller. The cameras 2-1 to 2-$n$ and the range sensors 3-1 to 3-$m$ are connected to the ECU 4 so that they can communicate via an in-vehicle network 5 conforming to a standard, such as a controller area network. The vehicle control system 1 may further include a storage device storing a map used for automated driving control of the vehicle 10. The vehicle control system 1 may further include a receiver, such as a GPS receiver, for determining the location of the vehicle 10 in conformity with a satellite positioning system; a wireless communication terminal for wireless communication with another device; and a navigation device for searching for a planned travel route of the vehicle 10.

Each of the cameras 2-1 to 2-$n$, which is an example of the image capturing unit, includes a two-dimensional detector constructed from an array of optoelectronic transducers, such as CCD or C-MOS, having sensitivity to visible light and a focusing optical system focusing an image of a target region on the two-dimensional detector. The cameras 2-1 to 2-$n$ are mounted on the vehicle 10 so as to capture different regions around the vehicle 10. To this end, the cameras 2-1 to 2-$n$ may have different focal lengths or be mounted on the vehicle 10 in different orientations. The cameras 2-1 to 2-$n$ capture respective capturing regions around the vehicle 10 every predetermined capturing period (e.g., $\frac{1}{30}$ to $\frac{1}{10}$ seconds), and generates images in which the respective capturing regions are represented. The images obtained by the cameras 2-1 to 2-$n$ are preferably color images.

Every time generating images, the cameras 2-1 to 2-$n$ output the generated images to the ECU 4 via the in-vehicle network 5.

The range sensors 3-1 to 3-$m$ may be sensors, such as LIDAR or radar, which can measure, for each bearing, the distance to an object located in the bearing. The range sensors 3-1 to 3-$m$ are mounted on the vehicle 10 so that they can measure the distances to objects located in different measurement areas around the vehicle 10. The range sensors 3-1 to 3-$m$ measure the distances to objects located in the respective measurement areas every predetermined measurement period (e.g., $\frac{1}{5}$ to $\frac{1}{20}$ seconds), and generate ranging signals indicating the respective results of measurement.

Every time generating ranging signals, the range sensors 3-1 to 3-$m$ output the generated ranging signals to the ECU 4 via the in-vehicle network 5.

Figure 2:
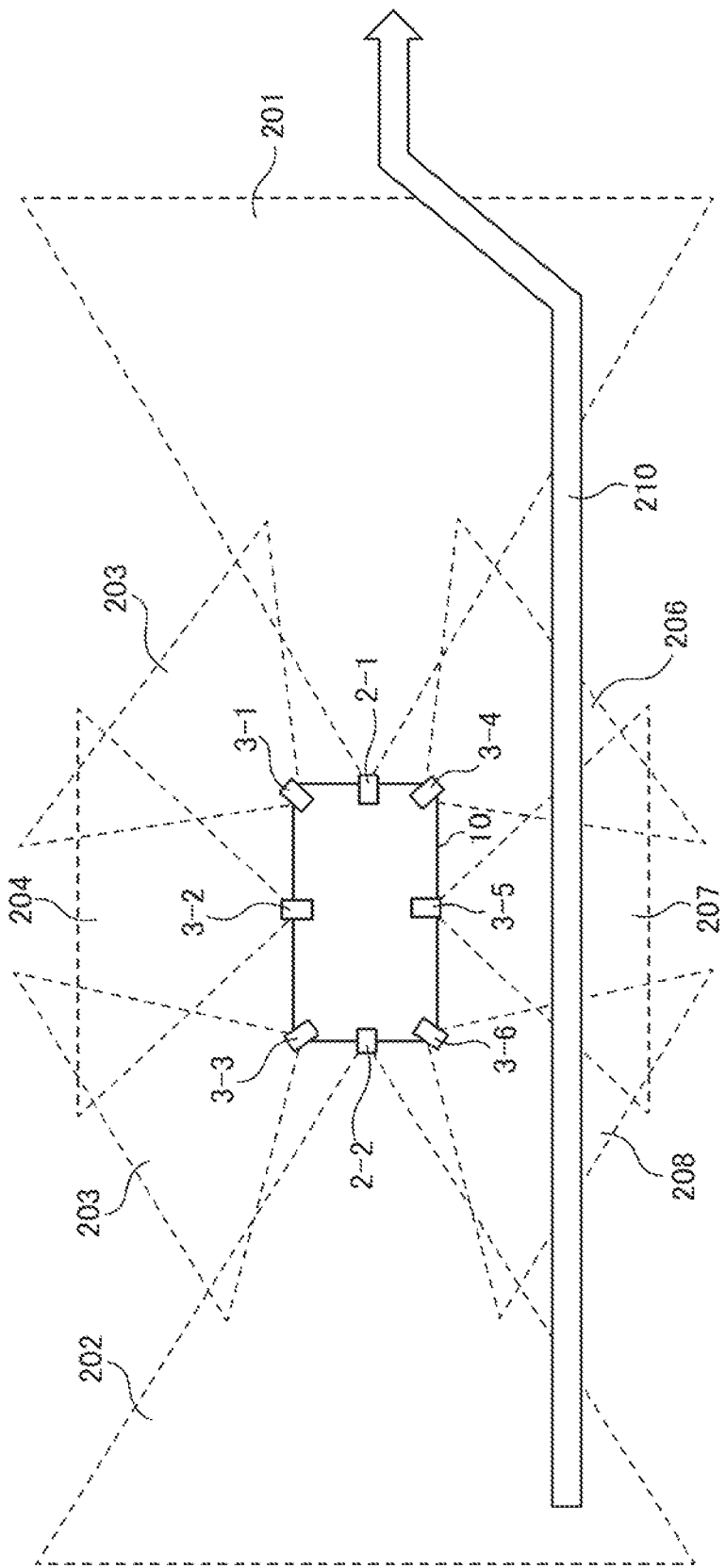
FIG. 2 schematically illustrates the arrangement of cameras and range sensors provided on a vehicle.

FIG. 2 schematically illustrates the arrangement of the cameras and range sensors provided on the vehicle. In this example, the vehicle 10 is provided with two cameras 2-1 and 2-2 and six range sensors 3-1 to 3-6. The cameras 2-1 and 2-2 are provided so as to capture a region 201 in front of the vehicle 10 and a region 202 behind the vehicle 10, respectively. The range sensors 3-1 to 3-3 are provided so that they can measure distances in a forward-left region 203, a left side region 204, and a rearward-left region 205 with respect to the vehicle 10, respectively. The range sensors 3-4 to 3-6 are provided so that they can measure distances in a forward-right region 206, a right side region 207, and a rearward-right region 208 with respect to the vehicle 10, respectively. In this way, each of the regions around the vehicle 10 can be captured by one of the cameras or scanned by one of the sensors to measure distances. For this reason, when another vehicle passes the vehicle 10 as indicated by an arrow 210, the ECU 4 can track the passing vehicle. The following describes the operation of the ECU 4, based on the arrangement of the cameras and range sensors illustrated in FIG. 2. However, the arrangement of the cameras and range sensors is not limited to this example. For example, a camera may be provided so as to capture a region on the left or right of the vehicle 10, or a range sensor may be provided so that it can measure a distance in a region in front of or behind the vehicle 10.

Figure 3:
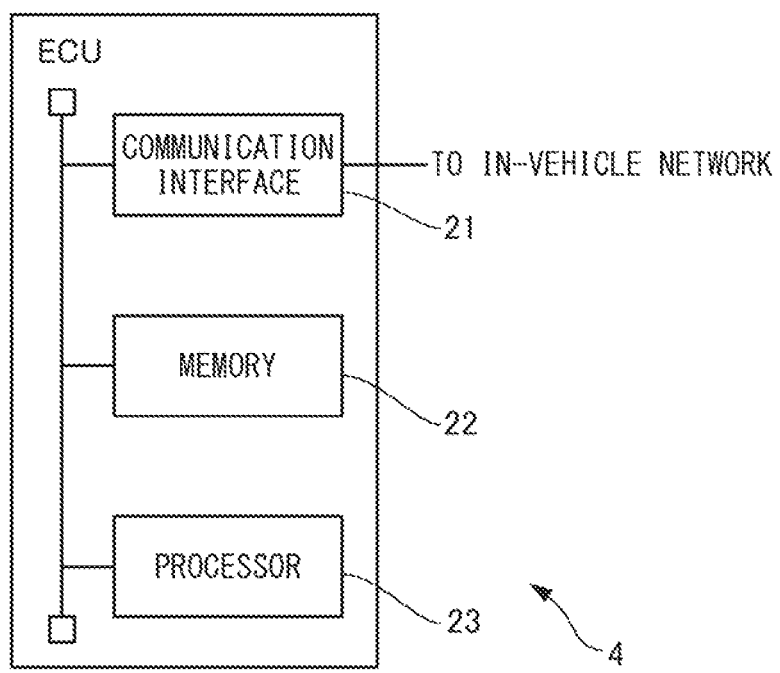
FIG. 3 illustrates the hardware configuration of an electronic control unit, which is an embodiment of the vehicle controller.

FIG. 3 illustrates the hardware configuration of the ECU, which is an embodiment of the vehicle controller. The ECU 4 controls the vehicle 10 so as to automatically drive the vehicle 10. In the present embodiment, the ECU 4 controls the vehicle 10 so as to automatically drive the vehicle 10, depending on an object detected from time series images obtained by each of the cameras 2-1 to 2-$n$ and from ranging signals obtained by each of the range sensors 3-1 to 3-$m$. To this end, the ECU 4 includes a communication interface 21, a memory 22, and a processor 23.

The communication interface 21, which is an example of a communication unit, includes an interface circuit for connecting the ECU 4 to the in-vehicle network 5. In other words, the communication interface 21 is connected to the cameras 2-1 to 2-$n$ and the range sensors 3-1 to 3-$m$ via the in-vehicle network 5. Every time receiving an image from one of the cameras 2-1 to 2-$n$, the communication interface 21 passes the received image to the processor 23. Every time receiving a ranging signal from one of the range sensors 3-1 to 3-*m*, the communication interface 21 passes the received ranging signal to the processor 23.

The memory 22, which is an example of a storing unit, includes, for example, volatile and nonvolatile semiconductor memories. In the case that the processor 23 includes multiple operation units as will be described below, the memory 22 may include dedicated memory circuits for the respective operation units. The memory 22 stores various types of data and various parameters used in a vehicle control process performed by the processor 23 of the ECU 4, e.g., images received from the cameras 2-1 to 2-*n*, ranging signals received from the range sensors 3-1 to 3-*m*, various parameters for specifying classifiers used in the vehicle control process, and confidence-score thresholds for respective types of objects. The memory 22 also stores various types of data generated in the vehicle control process, such as a detected-object list indicating information related to detected objects, for a certain period. The memory 22 may further store information used for travel control of the vehicle 10, such as map information.

The processor 23, which is an example of a control unit, includes one or more central processing units (CPUs) and a peripheral circuit thereof. The processor 23 may further include another arithmetic circuit, such as a logical operation unit, a numerical operation unit, or a graphics processing unit (GPU). Every time receiving an image from the cameras 2-1 to 2-*n* during travel of the vehicle 10, the processor 23 performs the vehicle control process on the received image. The processor 23 controls the vehicle 10 so as to automatically drive the vehicle 10, depending on a detected object near the vehicle 10.

The processor 23 performs the vehicle control process every predetermined period during travel of the vehicle 10 to automatically drive the vehicle 10.

Figure 4:
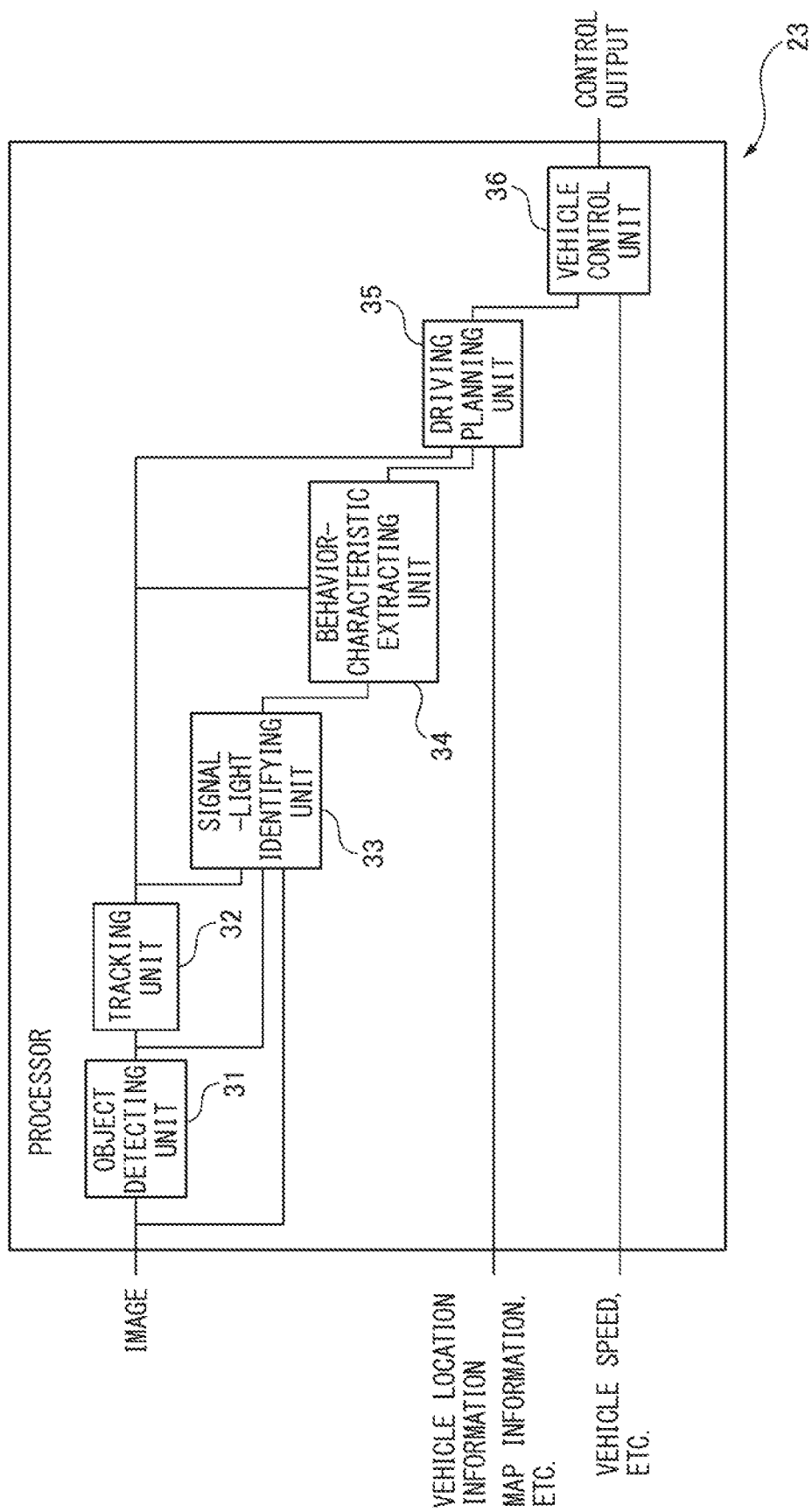
FIG. 4 is a functional block diagram of a processor of the electronic control unit, related to a vehicle control process.

FIG. 4 is a functional block diagram of the processor 23 of the ECU 4, related to the vehicle control process. The processor 23 includes an object detecting unit 31, a tracking unit 32, a signal-light identifying unit 33, a behavior-characteristic extracting unit 34, a driving planning unit 35, and a vehicle control unit 36. These units included in the processor 23 are, for example, functional modules implemented by a computer program executed on the processor 23.

Every time receiving an image from one of the cameras 2-1 to 2-*n*, the object detecting unit 31 inputs the latest received image into a first classifier for object detection to detect an object region including a detection target, such as another vehicle, represented in the image and to identify the type of the detection target. Besides other vehicles, examples of detection targets include objects that affect travel control of the vehicle 10, e.g., humans, signposts, traffic lights, road markings such as lane division lines, and other objects on roads.

In the present embodiment, the object detecting unit 31 uses, as the first classifier, a neural network that has been trained to detect an object region including a detection target represented in an image and to identify the type of the detection target. The neural network used by the object detecting unit 31 may be, for example, a "deep neural network" (hereafter, "DNN") having a convolutional neural network (hereafter, "CNN") architecture, such as a Single Shot MultiBox Detector (SSD) or a Faster R-CNN.

Figure 5:
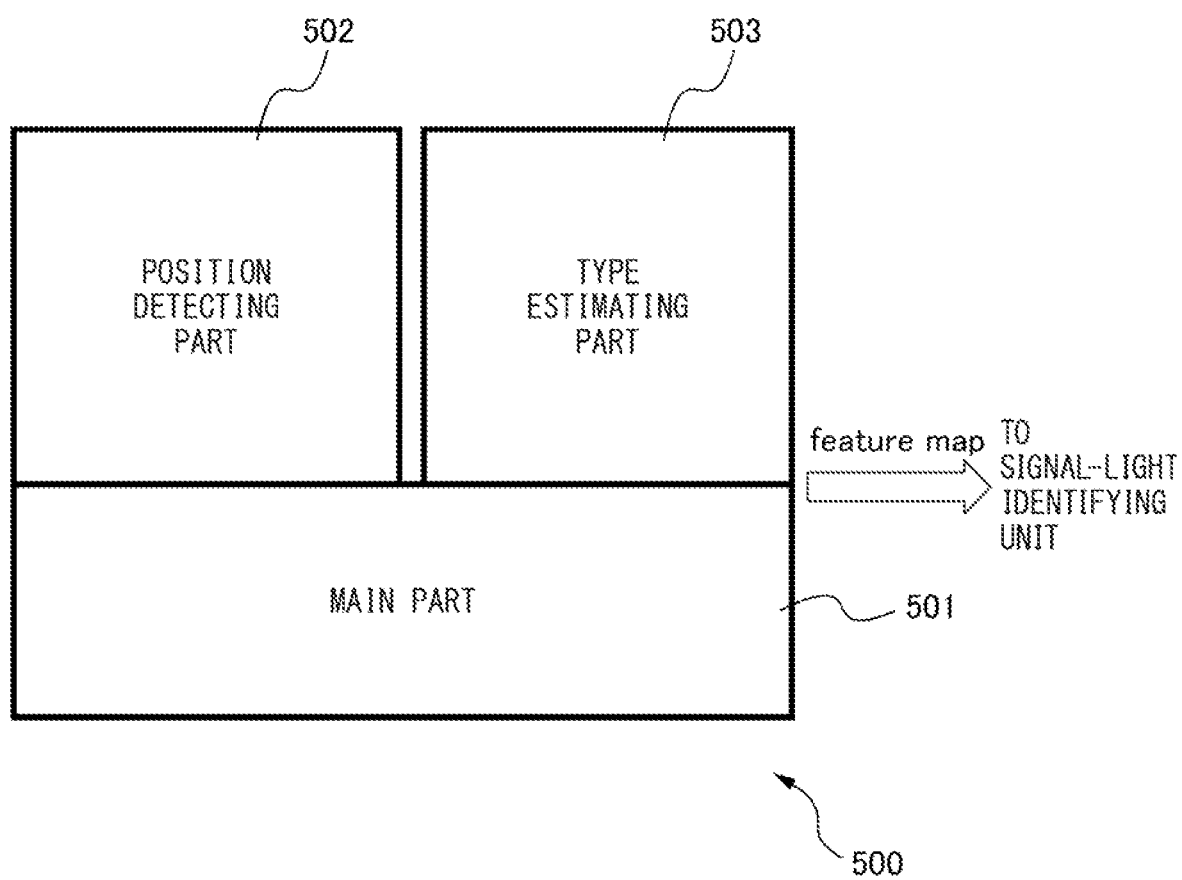
FIG. 5 illustrates an example of the configuration of a DNN used as the first classifier.

FIG. 5 illustrates an example of the configuration of a DNN used as the first classifier. The DNN 500 includes a main part 501, which is provided on the input of images, and a position detecting part 502 and a type estimating part 503, which are provided closer to the output than the main part 501. The position detecting part 502 outputs, as an object region, the circumscribed rectangle of a detection target represented in an image, depending on the output from the main part 501. The type estimating part 503 calculates confidence scores of respective types of detection targets represented in object regions detected by the position detecting pan 502, depending on the output from the main part 501. The position detecting part 502 and the type estimating part 503 may be integrated.

The main part 501 may be, for example, a CNN including multiple layers connected in series from the input toward the output. These multiple layers include two or more convolution layers. The multiple layers of the main part 501 may further include a pooling layer every one or more convolution layers. The multiple layers of the main part 501 may further include one or more fully-connected layers. For example, the main pan 501 may be configured similarly to a base layer of an SSD. Alternatively, the main part 501 may be configured in accordance with another CNN architecture, such as VGG-19, AlexNet, or Network-in-Network.

Upon input of an image, the main part 501 performs an operation on the image in each layer to output a feature map calculated from the image. The main part 501 may output multiple feature maps of different resolutions. For example, the main part 501 may output a feature map with the same resolution as the inputted image, and one or more feature maps with a resolution lower than the inputted image.

The feature maps outputted from the main part 501 are inputted into the position detecting part 502 and the type estimating part 503. The position detecting part 502 and the type estimating part 503 may be, for example, CNNs each including multiple layers connected in series from the input toward the output. In the position detecting part 502 and the type estimating part 503, the multiple layers of each CNN include two or more convolution layers. In the position detecting part 502 and the type estimating part 503, the multiple layers of each CNN may include a pooling layer every one or more convolution layers. The convolution layers and the pooling layers may be common to the CNNs of the position detecting part 502 and the type estimating part 503. Additionally, in the position detecting part 502 and the type estimating part 503, the multiple layers may include one or more fully-connected layers. In this case, the fully-connected layers are preferably provided closer to the output than the convolution layers. The outputs from the convolution layers may be directly inputted into the fully-connected layers. The output layer of the type estimating part 503 may be a softmax layer that calculates confidence scores of respective types of detection targets in accordance with a softmax function, or a sigmoid layer that calculates such confidence scores in accordance with a sigmoid function.

The position detecting part 502 and the type estimating part 503 are trained so as to output confidence scores of respective types of detection targets, for example, for each of regions located at various positions in an image and having various sizes and aspect ratios. Thus, upon input of an image, the classifier 500 outputs confidence scores of respective types of detection targets for each of regions located at various positions in the image and having various sizes and aspect ratios. The position detecting part 502 and the type estimating part 503 then detect a region for which the confidence score of a certain type of detection target is not less than a predetermined confidence-score threshold, as an object region representing a detection target of this type.

Images (training images) included in training data used for training of the classifier 500 are tagged with, for example, types of detection targets (e.g., ordinary passenger cars, buses, trucks, and motorcycles) and circumscribed rectangles of the detection targets, which are object regions representing the detection targets.

The classifier 500 is trained with a large number of such training images in accordance with a training technique, such as backpropagation. The use of the classifier 500 trained in this way allows the processor 23 to accurately detect a target object, such as a vehicle, from an image.

The object detecting unit 31 may further perform a non-maximum suppression (NMS) process to select one of object regions that are assumed to represent the same object out of two or more overlapping object regions.

The object detecting unit 31 enters, in a detected-object list, the position and area of each object region in the image, and the type of the object included in the object region. The object detecting unit 31 stores the detected-object list in the memory 22. For each object region, the object detecting unit 31 also stores, in the memory 22, a feature map that is calculated by the main part of the first classifier from the pixels included in the object region and is outputted to the signal-light identifying unit 33. Feature maps outputted to the signal-light identifying unit 33 may be ones with the same resolution as an image inputted into the first classifier. In the case that, for example, the pooling layer included in the main part of the first classifier calculates a feature map with a resolution lower than an inputted image, this low-resolution feature map may be outputted to the signal-light identifying unit 33. Feature maps of different resolutions calculated by the main part of the first classifier may be outputted to the signal-light identifying unit 33.

The tracking unit 32 tracks a vehicle that is located near the vehicle 10 and detected from an image obtained by one of the cameras 2-1 to 2-*n*, thereby estimating a trajectory along which the tracked vehicle passes. The tracking unit 32 then detects a predetermined action taken by the tracked vehicle, such as a lane change, based on the determined trajectory. At this tracking, the tracking unit 32 refers to not only images obtained from the cameras 2-1 to 2-***n* but also ranging signals obtained from the range sensors 3-1 to 3-*m* to track the vehicle even if the vehicle moves across two or more of the capturing regions of the cameras and the measurement areas of the range sensors. In this way, the tracking unit 32 can detect a predetermined action of a vehicle that comes from behind the vehicle 10 and passes the vehicle 10. For this reason, the processor 23 can correctly predict the behavior of such a vehicle and control the vehicle 10 so that the vehicle 10 will not collide with the former vehicle.

To track a vehicle moving in the capturing region of one of the cameras, the tracking unit 32 applies, for example, a tracking process based on optical flow, such as the Lucas-Kanade method, to time series images obtained by the camera. More specifically, the tracking unit 32 applies a filter for extracting characteristic points, such as a SIFT or Harris operator, to an object region of interest in the latest image obtained by one of the cameras, thereby extracting multiple characteristic points from the object region. Then, the tracking unit 32 may identify those points in the object regions in the past images obtained by the same camera which correspond to each of the characteristic points in accordance with the applied tracking technique, thereby calculating the optical flow. Alternatively, the tracking unit 32 may apply another tracking technique, which is applied for tracking a moving object detected from an image, to an object region of interest in the latest image and the object regions in the past images obtained by the same camera, thereby tracking the vehicle represented in the object regions.

The tracking unit 32 may track a vehicle moving between the capturing region of one of the cameras and the measurement area of one of the range sensors that overlap with each other. In this case, the tracking unit 32 refers to, for example, the mounted position, the angle of view, and the optical-axis direction of the camera as well as the mounted position and the measurement area of the range sensor and the direction to the center of the measurement area to determine the range of angles of the measured bearings, which corresponds to an object region including a vehicle of interest in an image obtained at a certain time, in the measurement signal obtained by the range sensor immediately before or after this time. The tracking unit 32 then determines that the vehicle of interest is included in a set of bearing angles in the determined range of angles in which the difference between distances from the range sensor is within a reference size expected for the type of the vehicle of interest.

To track a vehicle moving in the measurement area of one of the range sensors, the tracking unit 32 compares that set of bearing angles including the vehicle of interest which is determined in a ranging signal obtained by the range sensor at a certain time with the subsequently obtained ranging signal. The tracking unit 32 then determines that the vehicle of interest is included in a set of bearing angles in the subsequently obtained ranging signal for which the degree of match with the determined set is not less than a predetermined threshold. To this end, the tracking unit 32 may calculate the degree of match, for example, based on the sum of the differences between distances for corresponding bearing angles in the two sets of bearing angles compared with each other. Similarly, to track a vehicle moving across overlapping measurement areas of two range sensors, the tracking unit 32 compares, for example, that set of bearing angles including the vehicle of interest which is determined in a ranging signal obtained by one of the range sensors at a certain time with a ranging signal obtained by the other range sensor at or after this time. The tracking unit 32 then determines that the vehicle of interest is included in a set of bearing angles in the ranging signal obtained by the other range sensor for which the degree of match with the determined set is not less than a predetermined threshold.

To track a vehicle moving across the capturing regions of two different cameras, the tracking unit 32 compares an object region including the vehicle of interest in an image of interest obtained by one of the cameras with object regions in a comparison-target image obtained by the other camera. The tracking unit 32 then determines that the vehicle which is the same as the vehicle of interest is included in an object region in the comparison-target image for which the degree of match with the object region in the image of interest is not less than a predetermined threshold. In this case, the tracking unit 32 calculates, for example, the degree of match between characteristics included in the object region of the vehicle of interest in the feature map outputted from the main part of the first classifier for the image of interest and characteristics included in a compared object region in the feature map outputted from the main part of the first classifier for the comparison-target image, as a normalized cross-correlation value. Alternatively, the tracking unit 32 may input the pixel values or characteristics of the object region of the vehicle of interest and those of a compared object region into a classifier that has been trained to determine whether objects represented in two regions are identical, thereby determining whether an object represented in a compared object region is identical with the vehicle of interest. As such a classifier, the tracking unit 32 may use, for example, a neural network that has a CNN architecture and has been trained using a triplet loss as a loss function.

Of the vehicles detected from the latest image obtained by one of the cameras, the tracking unit 32 determines a vehicle associated with none of the vehicles represented in the past images or detected from images obtained by the other cameras or from ranging signals obtained by the range sensors as a new tracking target. The tracking unit 32 then assigns this unassociated vehicle an identification number that is different from the identification numbers of the other tracked vehicles, and enters the assigned identification number in the detected-object list. Of the vehicles detected from the latest image obtained by one of the cameras, the tracking unit 32 identifies a vehicle associated with one of the vehicles represented in the past images or detected from images obtained by the other cameras or from ranging signals obtained by the range sensors as a tracked vehicle. The tracking unit 32 then associates this identified vehicle with the same identification number as assigned to the tracked vehicle.

For each tracked vehicle, the tracking unit 32 determines a trajectory of the vehicle in the real space, and also determines the timings and the number of lane changes made by the vehicle in the latest certain period. To this end, the tracking unit 32 transforms, for each image representing the tracked vehicle, the image coordinates of the object region in the image including this vehicle into coordinates in an aerial image ("aerial-image coordinates"), using information such as the mounted position and the orientation of the camera that has acquired the image relative to the vehicle 10. The tracking unit 32 then performs a tracking process on sequential aerial-image coordinates and on bearings and distances corresponding to the tracked vehicle indicated in ranging signals of one of the range sensors, using a Bayesian filter, such as a Kalman filter, an extended Kalman filter, an unscented Kalman filter, or a particle filter, and thereby determines a trajectory of the tracked vehicle relative to the vehicle 10. Additionally, the tracking unit 32 compares lane division lines detected by the object detecting unit 31 from time series images obtained by one of the cameras during the vehicle tracking with the map information stored in the memory 22, thereby estimating the positions and orientations of the vehicle 10 at acquisition of the respective time series images. Then, the tracking unit 32 can determine the trajectory of the tracked vehicle in the world coordinate system from the trajectory in a coordinate system relative to the vehicle 10 by performing a coordinate transformation from the coordinate system relative to the vehicle 10 to the world coordinate system, based on the positions and orientations of the vehicle 10 in the world coordinate system at acquisition of the respective time series images obtained during the vehicle tracking. The tracking unit 32 can determine the travel lane of the tracked vehicle by comparing positions included in the trajectory of this vehicle in the world coordinate system with the positions of lanes indicated by the map information. The tracking unit 32 also determines that the tracked vehicle changes lanes when the trajectory of this vehicle in the world coordinate system crosses one of the lane division lines represented in the map information. In this way, the tracking unit 32 can determine the timing of a lane change and the travel lanes before and after the lane change for each tracked vehicle. The tracking unit 32 then stores, for each tracked vehicle, information indicating the number of lane changes made after the start of tracking, the position coordinates of the vehicle in the world coordinate system recorded every predetermined period, the timings of the lane changes, and the directions in which the respective lane changes are made in the memory 22 as tracking information.

The signal-light identifying unit 33 identifies the state of a signal light of a tracked vehicle, such as a turn signal.

For example, a vehicle blinks a turn signal when turning left or right. A vehicle also turns on brake lights when slowing down, and blinks hazard lights during a stop, for example. Turning-on or blinking of a signal light of a vehicle, such as a turn signal or a brake light, involves time-varying changes in outward appearance of the vehicle, and provides important information for predicting the behavior of the vehicle. However, since an individual image representing a turn signal, a brake light, or a hazard light does not represent time-varying changes caused by blinking of such a signal light, it is difficult to accurately identify whether a turn signal or a hazard light is blinking and whether a brake light is on or off, based on an individual image representing such a signal light. The signal-light identifying unit 33 accurately identifies whether a turn signal or a hazard light is blinking and whether a brake light is on or off, by inputting characteristics obtained from pixel values of object regions of time series images into a second classifier having a recursive structure.

In the present embodiment, the signal-light identifying unit 33 refers to the detected-object list to identify tracked vehicles. For each of the tracked vehicles, every time an image representing the vehicle is obtained from one of the cameras, the signal-light identifying unit 33 inputs characteristics obtained from pixel values of an object region including the vehicle in this image into a second classifier having a recursive structure.

As the characteristics obtained from pixel values of an object region representing a vehicle, the signal-light identifying unit 33 may use, for example, features included in the object region of a feature map calculated by the main part of the first classifier. This allows for using not only the characteristics of a vehicle of interest but also those of surroundings of this vehicle for state identification. In the present embodiment, the second classifier can identify the state of a signal light of a vehicle of interest, taking account of the effect of the positional relationship between the vehicle of interest and another vehicle, e.g., the situation in which a turn signal of the vehicle of interest is partially covered by another vehicle. For example, when the resolution of the feature map is the same as that of an image inputted into the first classifier, the features included in the region of the feature map corresponding to the object region of the inputted image are the characteristics obtained from pixel values of the object region. When the resolution of the feature map is lower than that of an image inputted into the first classifier, the position and area obtained by correcting the coordinates of the object region as a function of the ratio of the resolution of the feature map to that of the inputted image define the region of the feature map corresponding to the object region. For example, assume that the upper left end and the lower right end of the object region of the inputted image are (tlX, tlY) and (brX, brY), respectively, and that the feature map is calculated by scale-down of the inputted image to 1/N (N is an integer not less than two). In this case, the upper left end and the lower right end of the region of the feature map corresponding to the object region of the inputted image are (tlX/N, tlY/N) and (brX/N, brY/N), respectively.

According to a modified example, the signal-light identifying unit 33 may input, into the second classifier, pixel values of an object region representing a vehicle of interest in an image inputted into the first classifier as the characteristics obtained from pixel values of the object region representing the vehicle of interest. Alternatively, the signal-light identifying unit 33 may input, into the second classifier, values obtained by performing a predetermined filtering process, such as a convolution operation, on the pixels of the object region as the characteristics obtained from pixel values of the object region representing the vehicle of interest.

The signal-light identifying unit 33 performs downsampling or upsampling on the extracted characteristics of each object region to resize them to a predetermined size (e.g., 32 by 32). This allows the second classifier to use the inputted characteristics as constant-size ones even if the relative distance between the vehicle 10 and the tracked vehicle of interest changes during tracking to result in a change in size of the vehicle of interest in an image. Thus, the configuration of the second classifier is simplified.

FIG. 6 illustrates examples of an object region including a vehicle that is a target for identification of the state of a signal light performed by the second classifier. An image 600 illustrated in FIG. 6 is acquired, for example, by the camera 2-2, which is provided so as to capture a region behind the vehicle 10. In the image 600, vehicles 601 to 603 are detected as targets for identification of the state of a signal light. Thus, characteristics obtained from object regions 611, 612, and 613 respectively including the vehicles 601, 602, and 603 are inputted into the second classifier. An image 620 illustrated in FIG. 6 is acquired, for example, by the camera 2-1, which is provided so as to capture a region in front of the vehicle 10. In the image 620, vehicles 621 to 623 are detected as targets for identification of the state of a signal light. Thus, characteristics obtained from object regions 631, 632, and 633 respectively including the vehicles 621, 622, and 623 are inputted into the second classifier.

As the second classifier having a recursive structure, the signal-light identifying unit 33 may use, for example, a neural network having a recursive structure, such as a recurrent neural network (RNN), a long short-term memory (LSTM), or a gated recurrent unit (GRU). Since the second classifier is merely required to process characteristics included in an object region, the second classifier includes smaller input and intermediate layers and are defined by fewer parameters, which include weighting factors, than the first classifier. For this reason, the computation amount of the second classifier is less than that of the first classifier, allowing for reducing the computational burden on the processor 23. Further, the computation amount required to train the second classifier is also reduced. In the case that the first and second classifiers are configured as neural networks, these neural networks may be trained together by backpropagation with common training data.

The second classifier, which has a recursive structure, updates its internal state (also referred to as "intermediate state" or "hidden state"), which is recursively used therein, every time characteristics are chronologically inputted. In this way, the second classifier can identify the state of a signal light of a tracked vehicle of interest, based on time-varying changes in its outward appearance. This internal state is stored in the memory 22. Every time characteristics of a tracked vehicle of interest are inputted, the second classifier loads the latest internal state of the vehicle from the memory 22 and applies it to the operation of the second classifier.

In the present embodiment, the signal-light identifying unit 33 identifies, as the state of a signal light of a vehicle, whether its right or left turn signal or its hazard lights are blinking and whether its brake lights are on or off, as described above. To this end, for example, a sigmoid function is used as an activation function of the output layer of the second classifier. This allows the second classifier to output a confidence score of each state. The signal-light identifying unit 33 then compares the confidence score of each state with a corresponding threshold, and determines that the signal light of the vehicle is in the state for which the confidence score is not less than the corresponding threshold. For example, assume that the confidence score of the state in which the left turn signal of a vehicle of interest is blinking is 0.8, and that the confidence score of the state in which it is not blinking is 0.2. Further, assume that the threshold is 0.5; then, the signal-light identifying unit 33 determines that the signal light of the vehicle of interest is in the state in which the left turn signal is blinking.

Alternatively, a softmax function may be used as an activation function of the output layer of the second classifier. In this case, the second classifier outputs, as the state of a signal light of the vehicle of interest, one of the following determination results: the left turn signal is blinking; the right turn signal is blinking; the hazard lights are blinking; the brake lights are on; and none of the above. Thus, the signal-light identifying unit 33 may identify the state of the signal light of the vehicle of interest as the state indicated by the determination result outputted from the second classifier.

According to a modified example, the signal-light identifying unit 33 may use, as the second classifier, a neural network that has a CNN architecture and performs a convolution operation in the temporal direction. In this case, the second classifier includes, for example, one or more convolution layers that perform a convolution operation on a feature map outputted from the immediately preceding layer along the temporal direction (hereafter, "temporal-feature convolution layers"). The size of a kernel of the temporal-feature convolution layers related to the temporal direction is determined, for example, so that the convolution operation may be performed all over the period including characteristics inputted all at once by going through all of the temporal-feature convolution layers. The temporal-feature convolution layers may perform a convolution operation, for example, in both the temporal direction and the spatial directions (hereafter, a "three-dimensional convolution operation"), or a convolution operation only in the temporal direction (hereafter, a "time-dimensional convolution operation"). The temporal-feature convolution layers may also perform a convolution operation or a fully-connected operation in the channel direction. In the case that the second classifier includes multiple temporal-feature convolution layers, some of the temporal-feature convolution layers may perform a three-dimensional convolution operation whereas the other temporal-feature convolution layers may perform a time-dimensional convolution operation. The second classifier may also include one or more convolution layers that perform a convolution operation in the spatial directions without performing a convolution operation in the temporal direction (hereafter, "spatial-feature convolution layers"). The spatial-feature convolution layers may also perform a convolution operation or a fully-connected operation in the channel direction. In the case that the second classifier includes one or more spatial-feature convolution layers, the spatial-feature convolution layers and the temporal-feature convolution layers may be disposed in any order. For example, the spatial-feature convolution layers and the temporal-feature convolution layers may be provided in this order from the input toward the output, or in the opposite order. The spatial-feature convolution layers may alternate with the temporal-feature convolution layers. The second classifier may also include one or more pooling layers. The second classifier may also include one or more activation layers and one or more fully-connected layers. For example, a sigmoid function or a softmax function is used as an activation function of the output layer of the second classifier.

For each of the tracked vehicles, the signal-light identifying unit 33 adds the timing of every change in the identified state of a signal light and the state of the signal light after the change to the corresponding tracking information. For each of the tracked vehicles, the signal-light identifying unit 33 that uses a classifier having a recursive structure as the second classifier writes an updated internal state to the memory 22 at every update of the internal state caused by input of characteristics into the second classifier.

FIG. 7 illustrates an example of a detected-object list. The detected-object list 700 is generated, for example, for each of the cameras mounted on the vehicle 10. For each of the tracked vehicles, the detected-object list 700 contains an index indicating whether the vehicle is a target for identification of the state of a signal light, an identification number assigned to the vehicle, a pointer indicating the address of the memory 22 where information related to the vehicle is stored, and the number of times of identification of the state of a signal light performed by the signal-light identifying unit 33 (i.e., the number of times characteristics obtained from a corresponding object region are inputted into the second classifier). For each of the tracked vehicles, the detected-object list 700 also contains information indicating the position and area of the object region (not illustrated), information indicating the type of the vehicle (not illustrated), and other information. A storage area 701 in the memory 22 indicated by the pointer for each tracked vehicle stores the characteristics inputted into the second classifier for the latest image, the internal state of the second classifier updated last time, the result of identification of the state of a signal light, which is the result outputted from the second classifier updated last time, and other data.

FIG. 8 illustrates an example of the tracking information. For each of the tracked vehicles, the tracking information 800 includes an identification number assigned to the vehicle, the type of the vehicle, the position coordinates of the vehicle recorded every predetermined period (e.g., the capturing period of the cameras or the measurement period of the range sensors) after the start of tracking, the timings of lane changes, and the directions (left or right) in which the respective lane changes are made. For each of the tracked vehicles, the tracking information 800 also includes the timings at which a turn signal changes into a blinking state and the type of the blinking turn signal (right or left). For each of the tracked vehicles, the tracking information 800 may also include the lengths of periods during which the brake lights are on. For each of the tracked vehicles, the tracking information 800 may also include information indicating the current travel lane of the vehicle relative to that of the vehicle 10.

For each of the tracked vehicles, the behavior-characteristic extracting unit 34 refers to the tracking information to extract at least one piece of information indicating characteristics of an action of the vehicle or the state of a signal light of the vehicle at a predetermined action taken by the vehicle (hereafter simply "behavior-characteristic information"), based on the predetermined action detected in a period during which the vehicle is tracked (hereafter simply a "tracking period") and the state of the signal light related to the predetermined action.

As described above, the time lag between when a turn signal starts blinking and when a lane change is actually made varies depending on drivers. Additionally, some drivers do not operate a turn signal at a lane change. In contrast, a lane change is not made in some cases even when a turn signal is operated. For these reasons, the behavior-characteristic extracting unit 34 of the present embodiment extracts, as the behavior-characteristic information, the characteristics of an action of a tracked vehicle or the state of a turn signal at a lane change made by this vehicle. For example, the behavior-characteristic extracting unit 34 extracts the number of lane changes, the rate of occurrence of lane changes, the rate of lighting-up of turn signals, the rate of nonperformance of lane changes, and an average time lag as the behavior-characteristic information for each of the tracked vehicles.

The number of lane changes is the number of times the vehicle of interest changes lanes in the tracking period. The rate of occurrence of lane changes is the number of lane changes made per unit time (e.g., 1 or 10 minutes) and is obtained by dividing the number of lane changes made in the tracking period by the length of the period. It is supposed that the higher the rate of occurrence of lane changes, the more frequently the vehicle changes lanes.

The rate of lighting-up of turn signals is the ratio of the number of times a turn signal on the side of the destination lane of a lane change is changed into a blinking state in a predetermined period (e.g., 5 to 10 seconds) immediately before the lane change, i.e., the number of prior notifications of lane changes, to the number of lane changes made in the tracking period. For example, in the case that a vehicle traveling on the immediate right lane relative to the travel lane of the vehicle 10 moves to the travel lane of the vehicle 10, the behavior-characteristic extracting unit 34 determines that a prior notification of the lane change is made when the left turn signal is changed into a blinking state in a predetermined period immediately before the lane change. It is supposed that the lower the rate of lighting-up of turn signals, the more likely the vehicle is to change lanes without blinking a turn signal.

The rate of nonperformance of lane changes is the ratio of the number of times a lane change is not made even after a predetermined period from when the left or right turn signal is changed into a blinking state to the number of times the turn signal is changed into the blinking state in the tracking period. The higher the rate of nonperformance of lane changes, the lower the reliability of the state of a turn signal as information for determining whether the vehicle changes lanes.

The average time lag is the average of time lags of lane changes each of which is actually made in a predetermined period after a prior notification in the tracking period. Each of the time lags is a period from when a turn signal is changed into a blinking state until a lane change is made. It is supposed that the shorter the average time lag, the shorter the time lag between when a turn signal starts blinking and when a lane change is actually made.

The behavior-characteristic extracting unit 34 refers to the tracking information every predetermined period to update the behavior-characteristic information for each of the tracked vehicles, and stores the updated behavior-characteristic information in the memory 22.

FIG. 9 illustrates an example of the behavior-characteristic information. For each of the tracked vehicles, the behavior-characteristic information 900 includes an identification number assigned to the vehicle, the number of lane changes, the rate of occurrence of lane changes, the rate of lighting-up of turn signals, the rate of nonperformance of lane changes, and an average time lag.

The driving planning unit 35 refers to the detected-object list to generate one or more trajectories to be traveled of the vehicle 10 so that the vehicle 10 will not collide with an object near the vehicle 10. Each trajectory to be traveled is represented as, for example, a set of target locations of the vehicle 10 at points in time from the current time to a predetermined time ahead thereof. For example, the driving planning unit 35 predicts the behavior of each of the tracked vehicles, using the extracted behavior-characteristic information, and creates the trajectory to be traveled, based on the predicted behavior of the vehicles.

In the present embodiment, the driving planning unit 35 applies a prediction filter as described in relation to the tracking unit 32 to trajectories obtained from results of tracking performed by the tracking unit 32 to determine predicted trajectories to a predetermined time ahead. Additionally, the driving planning unit 35 generates a cost map that represents costs of individual locations in a region on the road in the direction of travel of the vehicle 10, based on the predicted trajectories of the respective tracked vehicles. In the cost map, the higher the possibility that one of the tracked vehicles is at a location, the higher the cost of this location. In other words, the costs of the locations which the predicted trajectory of one of the tracked vehicles passes are set higher than those of the other locations in the cost map. The costs of individual locations may vary with the passage of time.

For example, the driving planning unit 35 sets the costs of the locations which the predicted trajectory of one of the tracked vehicles passes higher than those of the other locations. To this end, the driving planning unit 35 may make the cost of a location which a predicted trajectory passes be the highest at the timing when the vehicle traveling along the predicted trajectory reaches this location, and may decrease the cost as time goes by or back from this timing.

Additionally, the driving planning unit 35 corrects the cost map, based on the behavior-characteristic information of the tracked vehicles, thereby obtaining a corrected cost map representing the predicted behavior of the vehicles.

FIG. 10 is an operation flowchart of cost-map correction based on the behavior-characteristic information. The driving planning unit 35 corrects the cost map in accordance with the following operation flowchart for each of the tracked vehicles.

For the vehicle of interest, the driving planning unit 35 determines whether the left or right turn signal is blinking at present (i.e., at input of characteristics of an object region in the latest image obtained by one of the cameras into the second classifier)(step S101). When the left or right turn signal is blinking at present (Yes in Step S101), the driving planning unit 35 determines whether the rate of nonperformance of lane changes of the vehicle of interest is not less than a first threshold Th1 (step S102).

When the rate of nonperformance of lane changes of the vehicle of interest is less than the first threshold Th1 (No in Step S102), it is highly likely that this vehicle actually changes lanes. Thus, the driving planning unit 35 increases, by a first correction value C1, the costs of individual locations on the predicted trajectory which the vehicle of interest having changed its lane to the side indicated by the blinking turn signal would pass (step S103). The driving planning unit 35 may apply the above-described prediction filter to the trajectory of the vehicle of interest on the assumption that it will change lanes, thereby identifying the individual locations which the vehicle having changed lanes would pass. Alternatively, the driving planning unit 35 may correct the predicted trajectory of the vehicle of interest so as to match a typical trajectory for a lane change, thereby identifying the individual locations which the vehicle having changed lanes would pass. Such a typical trajectory may be prestored in the memory 22. When the rate of nonperformance of lane changes of the vehicle of interest is not less than the first threshold Th1 (Yes in Step S102), this vehicle may not change lanes. Thus, the driving planning unit 35 increases, by a second correction value C2, the costs of individual locations on the predicted trajectory which the vehicle of interest having changed its lane to the side indicated by the blinking turn signal would pass (step S104). The second correction value C2 is set less than the first correction value C1. This enables the driving planning unit 35 to prevent the vehicle 10 from unnecessarily slowing down or taking an action to avoid danger. The lower the rate of nonperformance of lane changes of the vehicle of interest, the more the driving planning unit 35 may increase the correction values by which the costs of the locations which the vehicle having changed its lane to the side indicated by the blinking turn signal would pass are increased.

When none of the left and right turn signals are blinking at present in step S101 (i.e., the turn signals are off) (No in Step S101), the driving planning unit 35 determines whether the rate of lighting-up of turn signals of the vehicle of interest is not less than a second threshold Th2 (step S105). When the rate of lighting-up of turn signals of the vehicle of interest is not less than the second threshold Th2 (Yes in Step S105), it is highly likely that this vehicle keeps going on the current travel lane without changing lanes. Thus, the driving planning unit 35 decreases the costs of individual locations which are not on the predicted trajectory of the vehicle of interest by a third correction value C3 (step S106). When the rate of lighting-up of turn signals of the vehicle of interest is less than the second threshold Th2 (No in Step S105), this vehicle may change its lane to the left or right without blinking a turn signal. Thus, the driving planning unit 35 corrects the costs of individual locations which the vehicle of interest having changed its lane to the left or right would pass so as to be equal to those of individual locations on the predicted trajectory of this vehicle (step S107). This enables the driving planning unit 35 to reduce the danger of collision between the vehicle 10 and the vehicle of interest even when the vehicle of interest changes lanes without blinking a turn signal. The higher the rate of lighting-up of turn signals of the vehicle of interest, the more the driving planning unit 35 may increase the third correction value.

After step S103, S104, S106, or S107, the driving planning unit 35 determines whether the rate of occurrence of lane changes of the vehicle of interest is not greater than a third threshold Th3 (step S108). When the rate of occurrence of lane changes of the vehicle of interest is not greater than the third threshold Th3 (Yes in Step S108), this vehicle may keep going on the current travel lane without changing lanes. Thus, the driving planning unit 35 decreases the costs of individual locations which are not on the predicted trajectory of the vehicle of interest by a fourth correction value C4 (step S109). When the left or right turn signal is blinking, the driving planning unit 35 need not decrease the costs of individual locations where the vehicle of interest would pass at a lane change to the side indicated by the blinking turn signal. The lower the rate of occurrence of lane changes of the vehicle of interest, the more the driving planning unit 35 may increase the fourth correction value. When the rate of occurrence of lane changes of the vehicle of interest is greater than the third threshold Th3 (No in Step S108), this vehicle may change its lane to the left or right regardless of whether a turn signal is blinking. Thus, the driving planning unit 35 corrects the costs of individual locations which the vehicle of interest having changed its lane to the left or right would pass so as to be equal to those of individual locations on the predicted trajectory of this vehicle (step S110). This enables the driving planning unit 35 to reduce the danger of collision between the vehicle 10 and the vehicle of interest even if the vehicle of interest frequently changes lanes. After step S109 or S110, the driving planning unit 35 terminates the process of correcting the cost map. The driving planning unit 35 may change the order of the process of steps S101 to S107 and that of steps S108 to S110. The driving planning unit 35 may omit some of the steps S101 to S110. Additionally, as the average time lag of the vehicle of interest decreases, the driving planning unit 35 may decrease an estimated distance from the location of this vehicle where start of blinking of its left or right turn signal is detected to the location where this vehicle starts a lane change, and increase the costs of individual locations where this lane change is made by a predetermined value. This enables the driving planning unit 35 to reduce the danger of collision between the vehicle 10 and the vehicle of interest even when the vehicle of interest changes lanes immediately after blinking a turn signal.

The driving planning unit 35 calculates the sum of the costs of individual locations included in a trajectory to be traveled by referring to the location, speed, and orientation of the vehicle 10 and the corrected cost map, and generates the trajectory to be traveled so that the sum of the costs is the smallest. To this end, the driving planning unit 35 may generate the trajectory to be traveled in accordance with, for example, an optimization technique for mathematical programming. The driving planning unit 35 can estimate the location, speed, and orientation of the vehicle 10, based on, for example, current location information that is obtained from a GPS receiver (not illustrated) mounted on the vehicle 10 and indicates the current location of the vehicle 10. Alternatively, every time an image is obtained by the cameras 2-1 to 2-$n$, the object detecting unit 31 or a localizing processing unit (not illustrated) may detect lane division lines on the right and left of the vehicle 10 from this image, and compare the detected lane division lines with the map information stored in the memory 22, thereby estimating the location and orientation of the vehicle 10. Additionally, the driving planning unit 35 may refer to, for example, the current location information of the vehicle 10 and the map information stored in the memory 22 to count the number of lanes available for travel by the vehicle 10. When more than one lane is available for travel by the vehicle 10, the driving planning unit 35 may generate a trajectory to be traveled so that the vehicle 10 will make a lane change.

The driving planning unit 35 may generate multiple trajectories to be traveled. In this case, the driving planning unit 35 may select one of the trajectories such that the sum of the absolute values of acceleration of the vehicle 10 is the smallest.

The driving planning unit 35 notifies the vehicle control unit 36 of the generated trajectory to be traveled.

The vehicle control unit 36 controls the components of the vehicle 10 so that the vehicle 10 will travel along the notified trajectory to be traveled. For example, the vehicle control unit 36 determines the acceleration of the vehicle 10 in accordance with the notified trajectory to be traveled and the current speed of the vehicle 10 measured by a vehicle speed sensor (not illustrated), and determines the degree of accelerator opening or the amount of braking so that the acceleration of the vehicle 10 will be equal to the determined acceleration. The vehicle control unit 36 then determines the amount of fuel injection in accordance with the determined degree of accelerator opening, and outputs a control signal depending on the amount of fuel injection to a fuel injector of the engine of the vehicle 10. Alternatively, the vehicle control unit 36 outputs a control signal depending on the determined amount of braking to the brake of the vehicle 10.

When the vehicle 10 changes its course in order to travel along the trajectory to be traveled, the vehicle control unit 36 determines the steering angle of the vehicle 1) in accordance with the trajectory to be traveled, and outputs a control signal depending on the steering angle to an actuator (not illustrated) controlling the steering wheel of the vehicle 10.

FIG. 11 is an operation flowchart of the vehicle control process performed by the processor 23. The processor 23 performs the vehicle control process in accordance with the operation flowchart illustrated in FIG. 11 every predetermined control period.

The object detecting unit 31 of the processor 23 inputs the latest image obtained from one of the cameras 2-1 to 2-$n$ into the first classifier to detect one or more vehicles represented in the latest image. More specifically, the object detecting unit 31 detects one or more object regions including vehicles in the latest image (step S201). The object detecting unit 31 identifies the type of each detected vehicle. The object detecting unit 31 then enters the detected vehicles in the detected-object list.

The tracking unit 32 of the processor 23 tracks the detected vehicles to determine the trajectories of the detected vehicles, based on past images obtained by the cameras 2-1 to 2-$n$, and ranging signals obtained by the range sensors 3-1 to 3-$m$ (step S202). For each of the detected and tracked vehicles, the tracking unit 32 detects lane changes made in the period during which the vehicle is tracked, based on the trajectory of the vehicle, and records the timings of the detected lane changes and other data in the tracking information (step S203).

For each of the tracked vehicles, the signal-light identifying unit 33 of the processor 23 extracts characteristics obtained from pixel values of the object region detected in the latest image (step S204). The signal-light identifying unit 33 inputs the extracted characteristics into the second classifier having a recursive structure to identify the state of a signal light of the vehicle (step S205). The signal-light identifying unit 33 records the timings of changes in the identified state of the signal light and other data in the tracking information (step S206).

For each of the tracked vehicles, the behavior-characteristic extracting unit 34 of the processor 23 refers to the tracking information to extract the behavior-characteristic information (step S207).

For each of the tracked vehicles, the driving planning unit 35 of the processor 23 determines a predicted trajectory to a predetermined time ahead, and generates a cost map, based on the predicted trajectories of the tracked vehicles (step S208). In addition, the driving planning unit 35 corrects the cost map, based on the behavior-characteristic information of the tracked vehicles (step S209). The driving planning unit 35 then refers to the corrected cost map to generate a trajectory to be traveled of the vehicle 10 so that the cost may be the lowest (step S210). The vehicle control unit 36 of the processor 23 then controls the vehicle 10 so that the vehicle 10 will travel along the trajectory (step S211). The processor 23 then terminates the vehicle control process.

As has been described above, the vehicle controller identifies the state of a signal light, such as a turn signal, of another vehicle near a host vehicle, tracks the other vehicle, and detects a predetermined action, such as a lane change, taken by the other vehicle. The vehicle controller then determines the characteristics of the state of the signal light at the predetermined action taken by the tracked vehicle, based on the timings of the predetermined action taken by the tracked vehicle and of changes in the state of the signal light. For this reason, the vehicle controller can improve the accuracy of prediction on the behavior of another vehicle near a host vehicle. Since it corrects the cost map for creating a trajectory to be traveled of the host vehicle, based on the determined behavior characteristics, the vehicle controller can create a safer trajectory to be traveled so that the host vehicle will not collide with another vehicle. Additionally, since it uses the first classifier, which detects an object from an individual image, to extract characteristics to be inputted into the second classifier from each of the time series images, the vehicle controller can reduce the total computation amount as compared to the case in which the whole image is inputted into a classifier having a recursive structure to identify the state of the object. Additionally, images used to train the first classifier may be still images; in contrast, moving images are necessary to train the second classifier, but the size of each image included in the moving images may be smaller than that of the individual images used to train the first classifier. For this reason, the vehicle controller requires less cost of training the classifiers (e.g., cost incurred to collect and annotate training images), and requires a smaller computation amount and a shorter computation time to train the classifiers.

According to a modified example, the signal-light identifying unit 33 may refer to the tracking information to correct the threshold for determining the state of a signal light for each of the tracked vehicles. For example, the signal-light identifying unit 33 determines whether the average time lag of the vehicle of interest is not less than a fourth threshold Th4. When the average time lag of the vehicle of interest is not less than the fourth threshold Th4, the signal-light identifying unit 33 uses an ordinary setting value as the threshold for determining whether a turn signal is blinking. When the average time lag of the vehicle of interest is less than the fourth threshold Th4, the signal-light identifying unit 33 sets the threshold for determining whether a turn signal is blinking to be less than the ordinary threshold. Then, the signal-light identifying unit 33 is more likely to determine that a turn signal of the vehicle of interest is blinking, and thus can immediately detect changing a turn signal into a blinking state in relation to a vehicle whose average time lag is short. Additionally, the signal-light identifying unit 33 can immediately detect changing a turn signal of the vehicle of interest into a blinking state even when part of this vehicle is not represented in an image and thus identification of the state of a signal light is relatively difficult.

According to another modified example, the behavior-characteristic extracting unit 34 may determine, for each of the tracked vehicles, an average deceleration of the vehicle after the brake lights of the vehicle are turned on as a piece of behavior-characteristic information, based on the trajectory of the vehicle obtained by the tracking unit 32. It is supposed that the greater the average deceleration, the more rapidly the vehicle slows down when the brake lights are on. Thus, in the case that the brake lights of the vehicle of interest are on, the driving planning unit 35 advances the timings when the costs of individual locations which the predicted trajectory of this vehicle passes become the highest, as the average deceleration of this vehicle increases. Alternatively, the higher the average deceleration of the vehicle of interest, the lower the signal-light identifying unit 33 may decrease the threshold for determining whether the brake lights are on. Then, as the average deceleration increases, the signal-light identifying unit 33 is more likely to determine that the brake lights are on, and thus can immediately detect turning-on of the brake lights in relation to a vehicle having a high average deceleration.

According to another modified example, the object detecting unit 31 may use a classifier other than a DNN, to detect a detection target, such as a vehicle, from an image. For example, the object detecting unit 31 may use, as the first classifier, a support vector machine (SVM) that has been trained to output a confidence score indicating how likely a detection target is to be represented in a window defined on an image, in response to input of features (e.g., HOG) calculated with respect to the window. The object detecting unit 31 calculates the features with respect to a window defined on an image while variously changing the position, size, and aspect ratio of the window, and inputs the calculated features into the SVM to obtain the confidence score for the window. Then, the object detecting unit 31 may determine that a window for which the confidence score of a certain type of detection target is not less than a predetermined confidence-score threshold represents the detection target, and regard this window as an object region. The SVM may be prepared for each type of target object for detection. In this case, the object detecting unit 31 may input, for each window, the features calculated from the window into the SVMs to calculate the confidence scores for the respective types of objects.

According to still another modified example, the ECU 4 may perform the vehicle control process according to the above-described embodiment or modified examples, based on time series images obtained by only a single camera mounted on the vehicle 10, e.g., a camera provided so as to capture a region in front of the vehicle. Even in this case, the ECU 4 can extract characteristics of the behavior of a vehicle included in the capturing region of the camera for a certain period, and thus achieve the same advantageous effect as in the embodiment or modified examples.

A computer program for achieving the functions of the units of the processor 23 of the vehicle controller according to the embodiment or modified examples may be provided in a form recorded on a computer-readable and portable medium, such as a semiconductor memory, a magnetic recording medium, or an optical recording medium.

As described above, those skilled in the art may make various modifications according to embodiments within the scope of the present invention.

What is claimed is:

1. A vehicle controller for controlling travel of a vehicle, comprising:
 a processor configured to: input time series images obtained by a camera mounted on the vehicle into a first classifier to detect an object region including another vehicle near the vehicle in each of the time series images;
 track the other vehicle to estimate a trajectory of the other vehicle, based on the object region of each of the time series images;
 detect a predetermined action taken by the other vehicle, based on the determined trajectory;

input characteristics obtained from pixel values of the object region detected in each of the time series images into a second classifier to identify the state of a signal light of the other vehicle, the second classifier having a recursive structure or performing a convolution operation in a temporal direction;

extract at least one piece of behavior-characteristic information indicating characteristics of an action of the other vehicle or the state of a signal light of the other vehicle at the predetermined action taken by the other vehicle, based on the predetermined action detected in a tracking period during which the other vehicle is tracked and the state of the signal light of the other vehicle identified in the tracking period and related to the predetermined action, wherein the at least one piece of behavior-characteristic information comprises a rate of nonperformance of lane changes that is a ratio of the number of times the other vehicle does not change lanes after blinking of a turn signal to the number of times the other vehicle makes a turn signal blink in the tracking period;

predict behavior of the other vehicle, using the at least one piece of behavior-characteristic information;

create a trajectory to be traveled on which the vehicle will travel, based on the predicted behavior of the other vehicle; and control the vehicle so that the vehicle will travel along the trajectory to be traveled.

2. The vehicle controller according to claim 1, wherein the processor determines, based on the trajectory of the other vehicle, a predicted trajectory along which the other vehicle is predicted to pass from the current time to a predetermined time ahead, generates a cost map in which costs of locations on the predicted trajectory are set higher than costs of other locations, corrects the cost map, using the at least one piece of behavior-characteristic information, to obtain a corrected cost map representing the predicted behavior of the other vehicle, and creates the trajectory to be traveled in accordance with the corrected cost map so that costs on the trajectory to be traveled will be the lowest.

3. The vehicle controller according to claim 2, wherein the processor detects a lane change made by the other vehicle as the predetermined action taken by the other vehicle, and determines changing a turn signal of the other vehicle into a blinking state as changing into the state of the signal light related to the predetermined action.

4. The vehicle controller according to claim 3, wherein in the case that the processor has inputted characteristics of the object region in the latest image obtained by the camera after the time series images into the second classifier and thereby recognized that a turn signal of the other vehicle has changed into a blinking state, the processor corrects the cost map so that costs of individual locations which the other vehicle assumed to change lanes to a direction indicated by the turn signal will pass are increased by a first value when the rate of nonperformance of lane changes is less than a first threshold and corrects the cost map so that the costs of the individual locations are increased by a second value smaller than the first value when the rate of nonperformance of lane changes is not less than the first threshold.

5. The vehicle controller according to claim 3, wherein the processor extracts, as one of the at least one piece of behavior-characteristic information, a rate of lighting-up of turn signals that is a ratio of the number of times the other vehicle makes a turn signal blink before changing lanes to the number of times the other vehicle changes lanes in the tracking period.

6. The vehicle controller according to claim 5, wherein in the case that the processor has inputted characteristics of the object region in the latest image obtained by the camera after the time series images into the second classifier and thereby recognized that turn signals of the other vehicle are off, the processor corrects the cost map so that costs of individual locations which are not on the predicted trajectory are decreased by a predetermined value when the rate of lighting-up of turn signals is not less than a second threshold and corrects the cost map so that costs of individual locations which the other vehicle assumed to change lanes will pass are equal to the costs of the locations on the predicted trajectory when the rate of lighting-up of turn signals is less than the second threshold.

7. The vehicle controller according to claim 3, wherein the processor extracts, as one of the at least one piece of behavior-characteristic information, a rate of occurrence of lane changes that is the number of lane changes made by the other vehicle per unit time.

8. The vehicle controller according to claim 7, wherein the processor corrects the cost map so that costs of individual locations which are not on the predicted trajectory are decreased by a predetermined value when the rate of occurrence of lane changes is not greater than a third threshold and corrects the cost map so that costs of individual locations which the other vehicle assumed to change lanes will pass are equal to the costs of the locations on the predicted trajectory when the rate of occurrence of lane changes is greater than the third threshold.

9. The vehicle controller according to claim 3, wherein the processor extracts, as one of the at least one piece of behavior-characteristic information, an average of time lags each of which is a period from when the other vehicle starts blinking a turn signal before a lane change in the tracking period until the other vehicle changes lanes.

10. The vehicle controller according to claim 9, wherein upon input of the characteristics obtained from pixel values of the object region, the second classifier outputs a confidence score indicating how likely a turn signal that is a signal light of the other vehicle to be blinking, and the processor determines that the turn signal is blinking, when the confidence score is not less than a confidence-score threshold, and decreases the confidence-score threshold by a predetermined value when the average of the time lags is less than a predetermined threshold.

11. The vehicle controller according to claim 1, wherein the vehicle further includes a second camera configured to capture a second capturing region to generate a second image, the second capturing region being different from a capturing region of the camera, the processor inputs the second image into the first classifier to detect an object region including the other vehicle in the second image, and compares the object region in the second image with the object region in one of the time series images to track the other vehicle.

12. The vehicle controller according to claim 1, wherein the vehicle further includes a range sensor configured to generate a ranging signal every predetermined period, the ranging signal including, for each angle in a predetermined range of angles around the vehicle, a measured value of a distance to an object located in the direction of the angle, and the processor determines a range of angles in the ranging signal obtained at a first time immediately before or after acquisition of one of the time series images, the range of angles corresponding to the object region in the one of the time series images, and compares the range of angles of the ranging signal obtained at the first time with the ranging signal obtained at a second time later than the first time, thereby tracking the other vehicle.

13. A method for controlling travel of a vehicle, comprising:
- inputting time series images obtained by a camera mounted on the vehicle into a first classifier to detect an object region including another vehicle near the vehicle in each of the time series images;
- tracking the other vehicle to estimate a trajectory of the other vehicle, based on the object region of each of the time series images;
- detecting a predetermined action taken by the other vehicle, based on the determined trajectory;
- inputting characteristics obtained from pixel values of the object region detected in each of the time series images into a second classifier to identify the state of a signal light of the other vehicle, the second classifier having a recursive structure or performing a convolution operation in a temporal direction;
- extracting at least one piece of behavior-characteristic information indicating characteristics of an action of the other vehicle or the state of a signal light of the other vehicle at the predetermined action taken by the other vehicle, based on the predetermined action detected in a tracking period during which the other vehicle is tracked and the state of the signal light of the other vehicle identified in the tracking period and related to the predetermined action, wherein the at least one piece of behavior-characteristic information comprises a rate of nonperformance of lane changes that is a ratio of the number of times the other vehicle does not change lanes after blinking of a turn signal to the number of times the other vehicle makes a turn signal blink in the tracking period;
- predicting behavior of the other vehicle, using the at least one piece of behavior-characteristic information;
- creating a trajectory to be traveled on which the vehicle will travel, based on the predicted behavior of the other vehicle; and
- controlling the vehicle so that the vehicle will travel along the trajectory to be traveled.

14. A non-transitory recording medium having recorded thereon a computer program for controlling travel of a vehicle, the computer program that causes a processor mounted on the vehicle to execute a process comprising:
- inputting time series images obtained by a camera mounted on the vehicle into a first classifier to detect an object region including another vehicle near the vehicle in each of the time series images;
- tracking the other vehicle to estimate a trajectory of the other vehicle, based on the object region of each of the time series images;
- detecting a predetermined action taken by the other vehicle, based on the determined trajectory;
- inputting characteristics obtained from pixel values of the object region detected in each of the time series images into a second classifier to identify the state of a signal light of the other vehicle, the second classifier having a recursive structure or performing a convolution operation in a temporal direction;
- extracting at least one piece of behavior-characteristic information indicating characteristics of an action of the other vehicle or the state of a signal light of the other vehicle at the predetermined action taken by the other vehicle, based on the predetermined action detected in a tracking period during which the other vehicle is tracked and the state of the signal light identified in the tracking period and related to the predetermined action, wherein the at least one piece of behavior-characteristic information comprises a rate of nonperformance of lane changes that is a ratio of the number of times the other vehicle does not change lanes after blinking of a turn signal to the number of times the other vehicle makes a turn signal blink in the tracking period;
- predicting behavior of the other vehicle, using the at least one piece of behavior-characteristic information;
- creating a trajectory to be traveled on which the vehicle will travel, based on the predicted behavior of the other vehicle; and
- controlling the vehicle so that the vehicle will travel along the trajectory to be traveled.

* * * * *